United States Patent [19]

Sartori et al.

[11] 4,217,237

[45] Aug. 12, 1980

[54] PROCESS FOR REMOVING CARBON DIOXIDE CONTAINING ACIDIC GASES FROM GASEOUS MIXTURES USING A BASIC SALT ACTIVATED WITH A HINDERED AMINE

[75] Inventors: Guido Sartori, Linden, N.J.; Frederic Leder, Corona Del Mar, Calif.

[73] Assignee: Exxon Research & Engineering Co., Florham Park, N.J.

[21] Appl. No.: 910,861

[22] Filed: May 30, 1978

Related U.S. Application Data

[60] Division of Ser. No. 862,196, Dec. 19, 1977, Pat. No. 4,112,050, and a continuation-in-part of Ser. No. 590,427, Jun. 26, 1975, abandoned.

[51] Int. Cl.$^2$ .............................................. C09K 3/00
[52] U.S. Cl. .................................. 252/192; 252/189; 252/190; 423/228; 423/232; 423/234; 423/243
[58] Field of Search ...................... 252/189, 192, 190; 423/220, 223, 226–229, 232, 233, 236, 243; 260/564 R

[56] References Cited

U.S. PATENT DOCUMENTS

| | | | |
|---|---|---|---|
| 1,783,901 | 12/1930 | Bottoms | 423/228 |
| 2,139,122 | 12/1938 | Hass et al. | 260/584 R |
| 2,139,123 | 12/1938 | Hass et al. | 260/584 R |
| 2,139,124 | 12/1938 | Hass et al. | 260/584 R |
| 2,176,441 | 10/1939 | Ulrich et al. | 423/228 |
| 3,637,345 | 1/1972 | Leder | 423/228 |
| 3,793,434 | 2/1974 | Leder | 423/228 X |
| 3,856,921 | 12/1974 | Shrier et al. | 423/229 X |
| 4,096,085 | 6/1978 | Holoman et al. | 252/189 |

FOREIGN PATENT DOCUMENTS

| | | | |
|---|---|---|---|
| 619193 | 4/1961 | Canada | 423/228 |
| 1218083 | 1/1971 | United Kingdom | 423/228 |
| 1306853 | 2/1973 | United Kingdom | 423/228 |

OTHER PUBLICATIONS

Shrier, "$CO_2$ Absorption Amine-Promoter Potash Solutions," and & Chem. Fundamentals, vol. 8, pp. 415–423, 1969.

Dankwerts and Sharma, "The Chemical Engineer" Oct. 1966, pp. 244–280.

Primary Examiner—Benjamin R. Padgett
Assistant Examiner—J. L. Barr
Attorney, Agent, or Firm—Albert P. Halluin

[57] ABSTRACT

Carbon dioxide containing acidic gases are removed from a normally gaseous mixture by a process comprising contacting the normally gaseous mixture with an aqueous solution comprising (a) a basic alkali metal salt or hydroxide and (b) an activator for said basic salt or alkali metal salt or hydroxide comprising at least one sterically hindered amine.

12 Claims, 4 Drawing Figures

PROCESS FOR REMOVING CARBON DIOXIDE CONTAINING ACIDIC GASES FROM GASEOUS MIXTURES USING A BASIC SALT ACTIVATED WITH A HINDERED AMINE

CROSS REFERENCE TO RELATED APPLICATIONS

This is a division of application Ser. No. 862,196, filed Dec. 19, 1977, now U.S. Pat. No. 4,112,050.

This application is a continuation-in-part of U.S. application Ser. No. 590,427, filed June 26, 1975, now abandoned. This application is related to U.S. application Ser. No. 750,520, filed Dec. 14, 1976, now U.S. Pat. No. 4,094,957, issued June 13, 1978; U.S. application Ser. No. 768,420, filed Feb. 14, 1977; and U.S. application Ser. No. 768,421, filed Feb. 14, 1977.

BACKGROUND OF THE INVENTION

1. FIELD OF THE INVENTION

This invention relates to an improved process for removing acidic components from gaseous mixtures containing them and more particularly relates to the use of an amine activated basic salt solution for removing $CO_2$ containing gases wherein at least one of the amines is a sterically hindered amine.

2. DESCRIPTION OF THE PRIOR ART

It is well known in the art to treat gases and liquids, such as mixtures containing acidic gases including $CO_2$, $H_2S$, $SO_2$, $SO_3$, $CS_2$, HCN, COS and oxygen and sulfur derivatives of $C_1$ to $C_4$ hydrocarbons with amine solutions to remove these acidic gases. The amine usually contacts the acidic gases and the liquids as an aqueous solution containing the amine in an absorber tower with the aqueous amine solution contacting the acidic fluid countercurrently.

The acid scrubbing processes known in the art can be generally broken into three (3) categories.

The first category is generally referred to as the aqueous amine process where relatively large amounts of amine solutions are employed during the absorption. This type of process is often utilized in the manufacture of ammonia where nearly complete removal of the acid gas, such as $CO_2$, is required. It is also used in those instances where an acid gas, such as $CO_2$, occurs with other acid gases or where the partial pressures of the $CO_2$ and other gases are low.

A second category is generally referred to as the aqueous base scrubbing process or "hot potash" process. In this type of process a small level of an amine is included as an activator for the aqueous base used in the scrubbing solution. This type of process is generally used where bulk removal of an acid gas, such as $CO_2$, is desired. This process also applies to situations where the $CO_2$ and feed gas pressures are high. In such processes, useful results are achieved using aqueous potassium carbonate solutions and an amine activator.

A third category is generally referred to as the non-aqueous solvent process. In this process, water is a minor constituent of the scrubbing solution and the amine is dissolved in the liquid phase containing the solvent. In this process, the amine comprises up to 50% of the liquid phase. This type of process is utilized for specialized applications where the partial pressure of $CO_2$ is extremely high and/or where many acid gases are present, e.g. COS, $CH_3SH$ and $CS_2$.

The present invention pertains to an improved process for practicing the second category of acid scrubbing process described above, namely, the aqueous base scrubbing process or "hot potash" process. Many industrial processes for removal of acid gases, such as $CO_2$, use regenerable aqueous alkaline scrubbing solutions, such as an amine and potassium carbonate, which are continuously circulated between an absorption zone where acid gases are absorbed and a regeneration zone where they are desorbed usually by steam-stripping. The capital cost these acid scrubbing processes is generally controlled by the size of the absorption and regeneration towers, the size of the reboilers for generating stripping steam, and the size of the condensers which condense spent stripping steam so that condensate may be returned to the system to maintain proper water balance. The cost of operating such scrubbing plants is generally related to the amount of heat required for the removal of a given amount of acid gas, e.g., thermal efficiency, sometimes expressed as cubic feet of acid gas removed per pound of steam consumed. Means for reducing the costs in operating these industrial processes have focused on the use of absorbing systems or combinations of chemical absorbents which will operate more efficiently and effectively in acid gas scrubbing processes using existing equipment.

There are a number of patents which describe improvements to improve the efficiency of the "hot potash" process. Some of these improvements are described below.

In U.S. Pat. No. 2,718,454, there is described a process for using potash and similar alkali metal salts in conjunction with amines, such as monoethanolamine, diethanolamine and triethanolamine to remove acid gases from a gas mixture. The combination of the alkali metal compounds in conjunction with the designated amine yields higher capacity for acid gases than systems with the amines alone.

In U.S. Pat. No. 3,144,301, there is disclosed the use of potassium carbonate in conjunction with diethanolamine and monoethanolamine to remove $CO_2$ from gaseous mixtures.

In U.S. Pat. Nos. 3,637,345, 3,763,434, and 3,848,057, processes for the removal of acid gases by means of aqueous carbonate scrubbing solutions activated by an amine, such as 1,6-hexanediamine, piperidine and their derivatives are described.

In U.S. Pat. No. 3,856,921, there is disclosed a process for removal of acid gases from fluids by use of a basic salt of an alkali or alkaline earth metal and an amine activator, such as 2-methylaminoethanol, 2-ethylaminoethanol, morpholine, pyrrolidine and derivatives thereof.

U.S. Pat. Nos. 3,563,695, 3,563,696 and 3,642,430 to Benson disclose processes for removing $CO_2$ and $H_2S$ from gaseous mixtures by alkaline scrubbing processes wherein at least two separate regeneration zones are provided. Alkanolamines and aminoacids are described as activators, but the use of sterically hindered amines is not taught or disclosed in these patents.

Belgian Pat. No. 767,105 discloses a process for removing acid gases from gaseous streams by contacting the gaseous streams with a solution comprising potassium carbonate and an aminoacid, such as substituted glycines (e.g., N-isopropyl glycine, N-t-butylglycine, N-cyclohexylglycine, etc.). The data in Table IV of the patent indicates that the highly substituted compounds, such as N-t-butylglycine, are inferior to the straight chain compounds, such as N-n-butylglycine but N- cyclohexylglycine, a sterically hindered amine, has a good rate of absorption.

British Pat. No. 1,063,517 to Allen G. Eickmeyer discloses removal of acid gases, such as $CO_2$ and $H_2S$, from gaseous mixtures by the use of potassium carbonate and other alkali metal carbonates in conjunction with particular amines which will avoid corrosion problems and at the same time accelerate the absorption and subsequent desorption of the $CO_2$ and $H_2S$. Specifically disclosed amines are ethylene polyamine, alkanolamines, or alkanolamine borates as well as mixtures thereof. Examples of such amines are ethylenediamine, diethylenetriamine and diethanolamine.

British Pat. No. 1,218,083 describes a process for removing acid gases from feed streams by contacting the feed streams with a composition comprising an alkaline salt, such as potassium carbonate, and an alkanolamine such as diisopropanolamine.

British Pat. No. 1,238,696 discloses a process for removing acid gases from feed streams by contacting the feed streams with a composition comprising an organic solvent and an alkanolamine, such as cyclohexylaminoethanol. The patent does not disclose the advantages of using sterically hindered amines to improve working capacity.

British Pat. No. 1,305,718 describes a process for removing acid gases from gaseous streams by contacting the same with an absorbing solution comprising a solution of an alkaline salt of an alkali metal and regeneration of the absorbing solution wherein the absorbing solution includes a minor amount of a substituted or unsubstituted aminoacid. Examples of the aminoacids described are N-ethyl-3-amino propionic acid, N-ethyl-4-amino butyric acid, and N-ethyl-6-amino hexanoic acid.

U.S. Pat. No. 2,176,441 to Ulrich et al teaches the use of aminoacids having a primary, secondary or tertiary amino group and at least two nitrogen atoms to remove acidic gases. The patentees provide various general formulae for the aminoacids taught to be useful in the acid gas scrubbing process. While certain "sterically hindered amines" can be derived by proper choice of substituent groups in the general formulae there is no teaching that the sterically hindered amines will achieve any unexpected results, such as improved working capacity.

U.S. Pat. No. 1,783,901 to Bottoms teaches the use of aliphatic amine compounds including alkanolamines such as triethanolamine in an aqueous amine scrubbing process. The patent does not mention the use of sterically hindered amines.

U.S. Pat. Nos. 2,139,122, 2,139,123 and 2,139,124 to Haas et al disclose aminoalcohols (U.S. Pat. No. 2,139,122 discloses 2-amino-2-methyl-1-propanol) and in page 2, column 2, it is disclosed that these aminoalcohols, due to their basic nature may be utilized to absorb acids such as hydrogen sulfide or carbon dioxide from industrial gases.

Canadian Pat. No. 619,193 teaches the use of various aqueous solutions containing specific amino compounds for the removal of acidic gases, such as $CO_2$, from gaseous feed streams. Careful choice of the various $R_1$ and $R_2$ groups in the formula in column 4, lines 35–40, will reveal sterically hindered amines. However, there is no teaching that these amines give improved results or working capacity compared to nonsterically hindered amines.

Prior art workers have taught that sterically hindered amines would have low rates of combination with $CO_2$ and apparently concluded, although other explanations are possible, that such sterically hindered amines would be inefficient in $CO_2$ scrubbing processes. For example, Sharma, M. M., *Trans. Faraday Soc.*, 61, 681–8 (1965) described the kinetics of reaction of $CO_2$ and COS with 38 amines, some of which are sterically hindered amines. Other researchers have attributed relatively poor absorption rates of $CO_2$ by amines to steric hindrance. See, for example, J. L. Frahn and J. A. Mills, *Aust. J. Chem.*, 17, 256–73 (1964) and M. B. Jensen, *Acta Chemica Scandinavica*, 11, 499–505 (1957).

Shrier and Danckwerts, *Ind. Eng. Chem. Fundamentals*, 8, 415 (1969) discussed the use of amines as promoters for aqueous carbon dioxide absorption solutions. However, these researchers only ran initial absorption experiments and did not recognize the unique capacity advantages obtained by using sterically hindered amines in an acid gas scrubbing process. Also of interest is Danckwerts and Sharma, *The Chemical Engineer*, October 1966, pp. 244–280.

In the prior art discussed above, it is apparent that the efficiency of processes employing absorbing solutions is generally limited by the relatively slow rate of transfer of molecules of the acid gas from the gas phase to the liquid phase as well as in the regeneration of the absorbing solution. Many of the above-described prior art processes deal with means to render the acid gas scrubbing process more efficient.

It has now been discovered that sterically hindered amines unexpectedly improve the efficiency, effectiveness and cyclic working capacity of the acid gas scrubbing processes in all three of the above-mentioned process categories. In the case of the sterically hindered amine activated "hot potash" $CO_2$ containing acid gas scrubbing process of the present invention the process can be operated at a cyclic working capacity significantly greater than when diethanolamine or 1,6-hexanediamine is the amine activator used in a similar process. As explained in greater detail hereafter, it is postulated that the increase in cyclic capacity observed with the sterically hindered amines is due to the instability of their carbamates. In that respect, sterically hindered amines are similar to tertiary amines. Tertiary amines are not used on a commercial scale for carbon dioxide containing acid gas scrubbing due to their low rates of absorption and desorption.

SUMMARY OF THE INVENTION

In one embodiment of the present invention there is provided a process for the removal of $CO_2$ from gaseous feeds containing, which comprises contacting said gaseous feeds with an aqueous scrubbing solution comprising (a) a an alkaline material comprising basic alkali metal salt or alkali metal hydroxide and (b) an activator for said basic salt or hydroxide comprising at least one sterically hindered amine.

In another embodiment of the invention there is provided a process for the removal of $CO_2$ from gaseous feeds containing $CO_2$ which comprises, in sequential steps:

(1) contacting said feed with an aqueous scrubbing solution comprising (a) an alkaline material containing a basic alkali metal salt or hydroxide in an amount ranging from about 10 to about 40 wt. % based on the weight of said scrubbing solution, and (b) at least 2 wt. % of an amine activator, at conditions whereby said acidic components are absorbed in said scrubbing solution, and (2) regenerating said scrubbing solution at conditions whereby said $CO_2$ is desorbed from said scrubbing solution, the improvement which comprises:

providing at least one sterically hindered amine in said scrubbing solution as said amine activator, and operating said process at conditions whereby the difference between the moles of $CO_2$ absorbed at the end of step (1)(absorption step) and the moles of $CO_2$ absorbed at the end of step (2)(desorption step) would be greater, preferably at least about 15% greater, and more preferably 20 to 60% greater, at the thermodynamic equilibrium (as determined from the vapor-liquid equilibrium isotherm in the reaction mixture) than in an aqueous scrubbing process wherein diethanolamine or 1,6-hexanediamine is the only amine activator utilized under similar conditions of gaseous feed composition, scrubbing solution composition, temperatures and pressures.

Various aqueous solutions which are known in the art for the absorption of carbon dioxide from gaseous mixtures may be found in U.S. Pat. No. 3,793,434, herein incorporated by reference.

In general, the aqueous scrubbing solution will comprise an alkaline material comprising a basic alkali metal salt or alkali metal hydroxide selected from the Group IA of the Periodic Table of Elements. More preferably, the aqueous scrubbing solution comprises potassium or sodium borate, carbonate, hydroxide, phosphate or bicarbonate. Most preferably, the aqueous solution comprises potassium carbonate.

The alkaline material comprising a basic alkali metal salt or alkali metal hydroxide may be present in the scrubbing solution at a weight percent of from 10 to 40, more preferably from 20 to 35 weight percent. In aqueous scrubbing processes the concentration of the alkaline material will be selected so as to remain in solution throughout the entire cycle of absorption of $CO_2$ from the gas stream and desorption of $CO_2$ in the regeneration step.

The sterically hindered amine activators used in the practice of the present invention are compounds containing at least one secondary amino group attached to either a secondary or tertiary carbon atom or a primary amino group attached to a tertiary carbon atom. These amine activators are selected to be at least partly soluble in the particular solvent used. In aqueous solutions the sterically hindered amine activator will preferably additionally comprise one or more water-solubilizing groups which may be selected from the group consisting of amino groups, i.e. additional sterically hindered amino groups, hydroxy groups and carboxyl groups. At least one nitrogen atom will have a sterically hindered structure as described above. As described in more detail hereinafter, the sterically hindered amine activators are most preferably selected from the group consisting of aminoethers, aminoalcohols, di- and triamines.

In still another embodiment of the present invention there is provided an aqueous scrubbing solution comprising an aqueous mixture containing 10 to about 40 weight percent of an alkaline material comprising a basic alkali metal salt or alkali metal hydroxide selected from Group IA of the Periodic Table of the Elements, preferably potassium or sodium borate, carbonate, hydroxide, phosphate or bicarbonate, and most preferably potassium carbonate, and 2 to about 20 weight percent of at least one sterically hindered amine activator, wherein the sterically hindered amine is defined as being a compound having at least one secondary amino group attached to either a secondary or tertiary carbon atom or a primary amino group attached to a tertiary carbon atom. The sterically hindered amine activator is preferably selected from the group consisting of aminoethers, aminoalcohols, di- and triamines, and most preferably selected from the group consisting of N-cyclohexyl-1,3-propanediamine, 1,8-p-menthanediamine, 1,7-bis-sec.butyl-diethylenetriamine,2,2,5,5-tetramethyl diethylenetriamine, 3-amino-3-methyl-1-butanol, 2-amino-2-methyl-1-propanol, $N_1$-isopropyl-2-methyl-propanediamine; $N_1$(1,1-dimethyl-2-hydroxyethyl)-2-methyl-1,2-propanediamine; and $N_1$-isopropyl-$N_2$-(3-aminopropyl)-2-methyl-1,2-propanediamine. Especially preferred is N-cyclohexyl-1,3-propanediamine.

DESCRIPTION OF THE PREFERRED EMBODIMENTS

Figure 1:
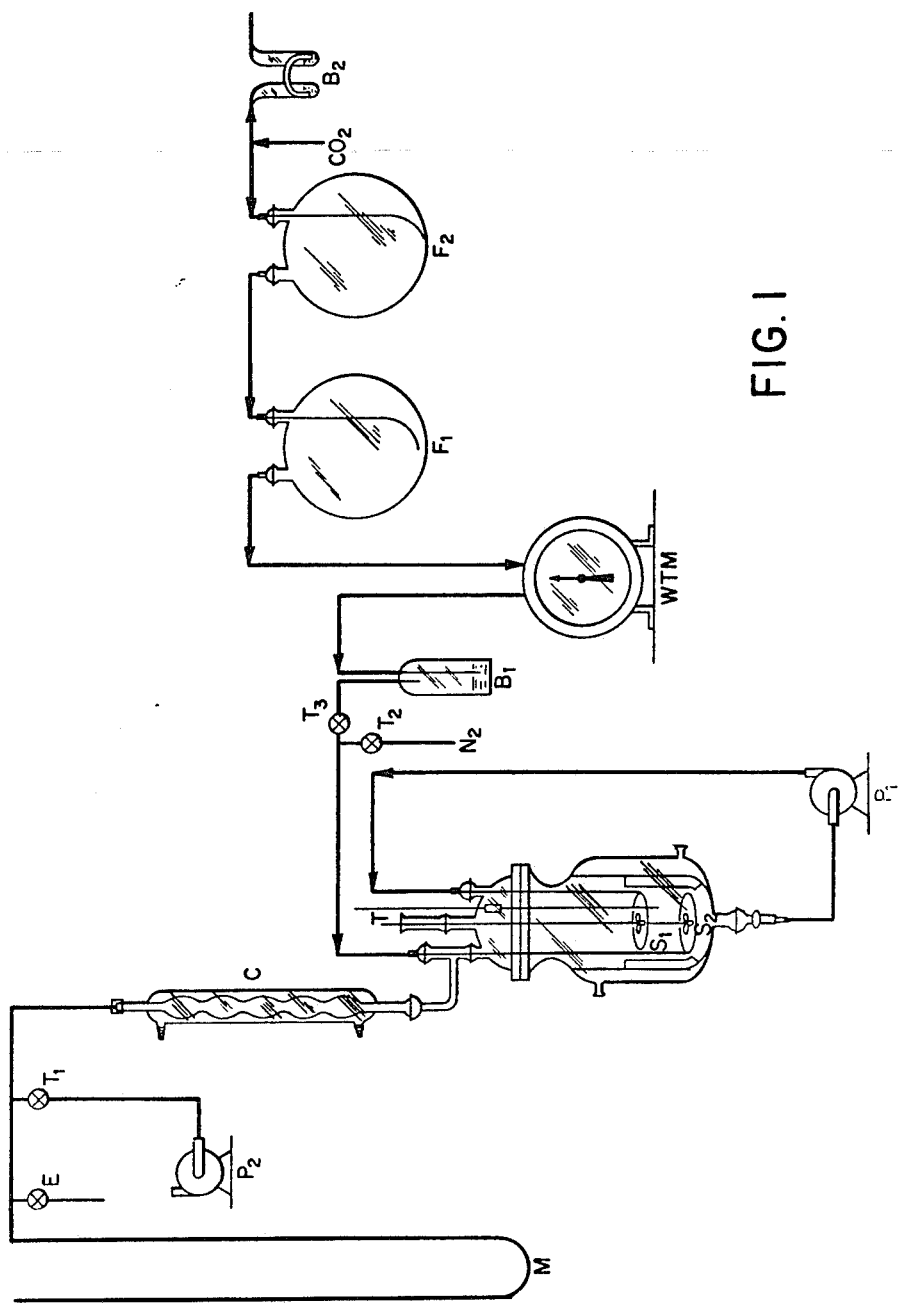
FIG. 1 is a diagrammatic flow sheet illustrating an experimental reaction apparatus for removing carbon dioxide from gaseous streams.

The term carbon dioxide containing acidic gas feeds also includes $H_2S$, $SO_2$, $SO_3$, $CS_2$, HCN, COS and the oxygen and sulfur derivatives of $C_1$ to $C_4$ hydrocarbons in various amounts as they frequently appear in gaseous mixtures. These acid gases other than the carbon dioxide may be present in trace amounts within a gaseous mixture or feed.

The contacting of the absorbent mixture and the feed gas may take place in any suitable contacting tower. In such processes, the gaseous mixture from which the $CO_2$ is to be removed may be brought into intimate contact with the absorbing solution using conventional means, such as a tower packed with, for example, ceramic rings or with bubble cap plates or sieve plates, or a bubble reactor.

In a preferred mode of practicing the invention, the absorption step is conducted by feeding the gaseous mixture into the base of the tower while fresh absorbing solution is fed into the top. The gaseous mixture freed largely from acid gases emerges from the top. Preferably, the temperature of the absorbing solution during the absorption step is in the range from about 25° to about 200° C., and more preferably from 35° to about 150° C. Pressures may vary widely; acceptable pressures are between 5 and 2000 psig, preferably 100 to 1500 psig, and most preferably 200 to 1000 psig in the absorber. In the desorber the pressures will range from about 5 to 100 psig. The partial pressure of the acid gas, e.g., $CO_2$ in the feed mixture will preferably be in the range from about 0.1 to about 500 psia, and more preferably in the range from about 1 to about 400 psia. The contacting takes place under conditions such that the acid gas, e.g., $CO_2$, is absorbed by the solution. Generally, the countercurrent contacting to remove the acid gases, e.g., $CO_2$ will last for a period of from 0.1 to 60 minutes, preferably 1 to 5 minutes. During absorption, the solution is preferably maintained in a single phase.

The absorbing solution comprising the aqueous mixture containing the basic alkali metal salt and sterically hindered amine which is saturated or partially saturated with gases, such as $CO_2$ and $H_2S$ may be regenerated so that it may be recycled back to the absorber. The regeneration should also preferably take place in a single liquid phase. The regeneration or desorption is accomplished by conventional means, such as pressure reduction, which causes the acid gases e.g., $CO_2$ and $H_2S$ to flash off or by passing the solution into a tower of similar construction to that used in the absorption step, at or near the top of the tower, and passing an inert gas such as air or nitrogen or preferably steam up the tower. The temperature of the solution during the regeneration step may be the same as used in the absorbing step, i.e. 25° to about 200° C. and preferably 35° to about 150° C. The absorbing solution, after being cleansed of at least a portion of the acid bodies, may be recycled back to the absorbing tower. Makeup absorbent may be added as needed.

For example, during desorption, the acid gas, e.g., $CO_2$-rich solution from the high pressure absorber is sent first to a flash chamber where steam and some $CO_2$ are flashed from solution at low pressure. The amount of $CO_2$ flashed off will in general be about 35 to 40% of the net $CO_2$ recovered in the flash and stripper. Solution from the flash drum is then steam stripped in the packed or plate tower, stripping steam having been generated in the reboiler in the base of the stripper. Pressure in the flash drum and stripper is usually 16 to about 100 psia, preferably 16 to about 30 psia, and the temperature is in the range from about 25° to about 200° C., preferably 35° to about 150° C., and more preferably 100° to about 140° C. Stripper and flash temperatures will, of course, depend on stripper pressure, thus at about 16 to 25 psia stripper pressures, the temperature will preferably be about 100° to about 140° C. during desorption. The solution is preferably maintained as a single phase during desorption.

In the most preferred embodiment of the present invention, the acid gases, e.g., carbon dioxide containing gases, are removed from a gaseous feed containing carbon dioxide by means of a process which comprises, in sequential steps:

(1) contacting the gaseous feed with an aqueous scrubbing solution comprising (a) potassium carbonate in an amount ranging from about 10 to about 40 weight percent, preferably 20 to about 35 weight percent, based on the weight of the scrubbing solution, (b) an amine activator, in an amount ranging from about 2 to about 20 weight percent, preferably 5 to about 15 weight percent, based on the weight of the scrubbing solution, said amine activator being comprised of at least one sterically hindered amine, said sterically hindered amine being defined as containing at least one secondary amino group attached to either a secondary or tertiary carbon atom or a primary amino group attached to a tertiary carbon atom and being selected from the group consisting of aminoethers, aminoalcohols, di- and tri-amines, the balance of said scrubbing solution being comprised of water, said contacting being conducted at conditions whereby the acid gases e.g., $CO_2$ are absorbed in said scrubbing solution, and preferably at a temperature ranging from 25° to about 200° C., more preferably ranging from about 35° to about 150° C., and a pressure ranging from 100 to about 1500 psig, and (2) regenerating said solution at conditions whereby said acid gases are desorbed from said scrubbing solution, and preferably at a temperature ranging from 25° to about 200° C., more preferably ranging from about 35° to about 150° C., and a pressure ranging from 16 to about 100 psia.

The time of contacting the gaseous mixture with the amine-promoted scrubbing solution of the invention may vary from a few seconds to hours, for example, 15 minutes.

After contacting the gaseous mixture with the amine-promoted scrubbing solution until the capacity of at least about 80% or preferably at least about 90% of the solution's capacity is depleted, it must be regenerated. The capacity of the amine-promoted scrubbing solution includes the capacity of the dissolved alkali metal salt, e.g., potassium carbonate for reacting with the carbon dioxide as well as the capacity of the sterically hindered amine of the invention for the carbon dioxide. Regeneration of the amine-promoted scrubbing solution may be accomplished by decreasing the pressure and/or increasing the temperature of the amine-promoted scrubbing solution to a point at which the absorbed carbon dioxide flashes off. The addition of an inert gas, e.g., $N_2$ or steam during the regeneration of the amine-promoted scrubbing solution is also within the scope of the present invention. The process of regeneration is more particularly described in U.S. Pat. No. 3,848,057, herein incorporated by reference. The sterically hindered amines of the present invention allow a more complete desorption as compared to the prior art amine-promoted scrubbing solutions, e.g., diethanolamine or 1,6-hexanediamine promoted potassium carbonate run under the same desorption conditions. Thus, savings in the steam utilized to heat and purge the amine-promoted scrubbing solution during regeneration are obtained.

DETAILED DESCRIPTION OF THE SCRUBBING SOLUTION

It has been known in the past to use alkali metal carbonates, bicarbonates, hydroxides, borates and phosphates for the absorption of the $Co_2$ containing acidic gases from a fluid or gaseous mixture. These salts may be used in the present invention. Typical salts which may be utilized in the practice of the present invention include sodium hydroxide, sodium carbonate, lithium carbonate, potassium hydroxide, potassium bicarbonate, potassium carbonate and cesium carbonate, potassium carbonate being most preferred.

The sterically hindered amines used as activators in the scrubbing solution of the present invention are preferably defined as those amines containing at least one secondary amino group attached to either a secondary or tertiary carbon atom or a primary amino group attached to a tertiary carbon atom. The sterically hindered amine activators of the invention are preferably selected from the group consisting of aminoethers, aminoalcohols, di- and triamines.

The sterically hindered amine of the instant invention will preferably be selected according to other parameters besides steric hindrance. Preferably, the sterically hindered amines will be asymmetrical compounds inasmuch as the symmetrical amines have a tendency to give solid precipitates in the aqueous alkaline compositions utilized in the type of process involved in the instant invention. Such has been the case observed with N,N'-di-isopropyl-ethylenediamine and 2,5-diamino-2,5-dimethylhexane. The precipitate could be a bicarbonate or bicarbamate, easily undergoing crystallization owing to the symmetrical structure of these compounds. The precipitate was not observed in the case of asymmetric sterically hindered amines, such as 1,8-p-menthanediamine and 2,2,5,5-tetramethyldiethylenetriamine. In the case of 1,7-di-sec.-butyl-diethylenetriamine, precipitation was not observed, although the molecule is symmetric. However, the degree of symmetry for this compound is lower than in the case of N,N'-diisopropyl-ethylenediamine and 2,5-diamino-2,5-dimethylhexane. Besides, the central amino group, being sterically unhindered, easily undergoes carbamation, thereby increasing solubility and hindering precipitation.

It is also important in choosing an amine for use in the process of the instant invention that it have low volatility so that it will not be lost during absorption and desorption. The sterically hindered amine generally should have a boiling point of at least 100° C., preferably at least 180° C. The amine used need not be completely soluble in water since partial immiscibility can increase the rate of carbon dioxide absorption from the gaseous mixture as it increases the total contact surface between liquid and gas. On the other hand, if the amine is insoluble in the water phase over most of the carbonation ratio interval, that can create a problem in an industrial absorber. Such is the case with 1,8-p-menthanediamine, although the appropriate selection of an emulsifier is believed to solve this problem. The presence of sterically unhindered amino groups can be useful as they easily undergo carbamation, thereby reducing volatility. The melting point should be lower than 60°-70° C. Of course, the amine should be stable under the reaction conditions.

Monoamines are not generally suitable as activators in the process of the instant invention because the lower members of the family are too volatile and the higher members have limited solubility. Monoaminoalcohols and monoaminoacids are much less volatile and much more soluble than the corresponding monoamines containing the same number of carbon atoms. However, it has been observed that some monoaminoalcohols and monoaminoacids lead to lower rate increases than those observed with the diamines, presumably owing to hydrogen-bond stabilization of the carbamates.

Nonlimiting examples of the sterically hindered amines useful as promoters for the scrubbing solution of the present invention include:

Diamines
Monoprimary aliphatic diamines

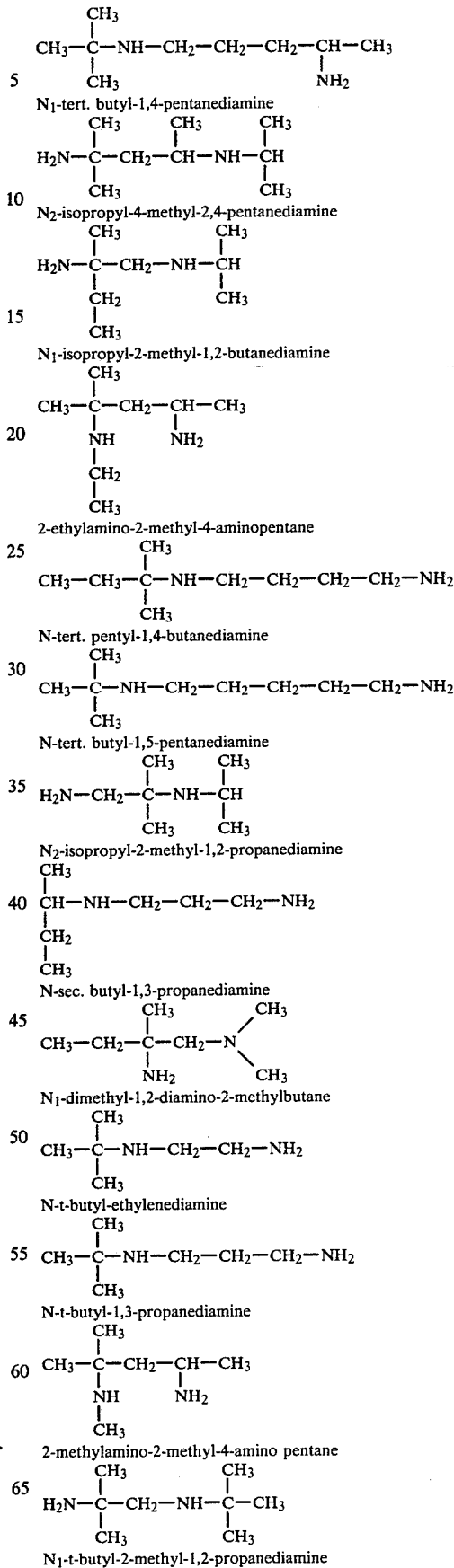

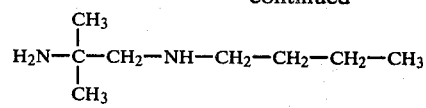
N₁-butyl-2-methyl-1,2-propanediamine

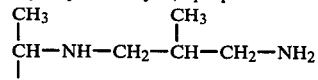
N-sec. butyl-2-methyl-1,3-propanediamine

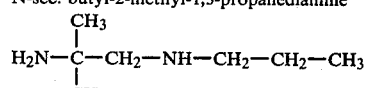
N₁-propyl-2-methyl-1,2-propanediamine

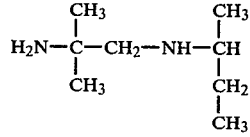
N₁-sec. butyl-2-methyl-1,2-propanediamine

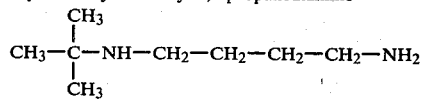
N-t-butyl-1,4-butanediamine

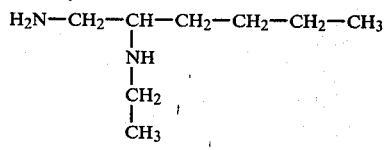
N₂-ethyl-1,2-hexanediamine

Arylaliphatic diamines in which the amino groups are separated by up to 5 or more than 6 carbon atoms:

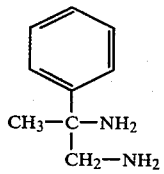
1-methyl-1-phenyl ethylenediamine

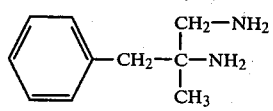
2-benzyl-1,2-propanediamine

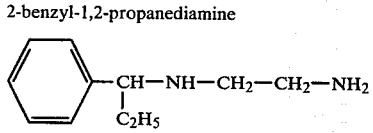
1-phenyl-1(2-amino-ethylamino)-propane

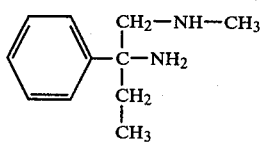
N₁-methyl-2-phenyl-1,2-butanediamine

Cycloaliphatic diamines:

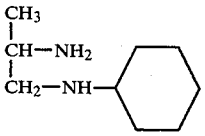
N₁-cyclohexyl-1,2-propanediamine

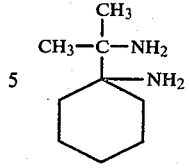
1-amino-1-(2-amino-isopropyl)-cyclohexane

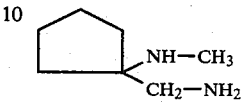
1-methylamino-1-aminomethyl-cyclopentane

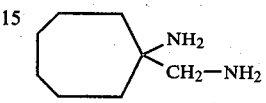
1-amino-1-aminomethylcycloheptane

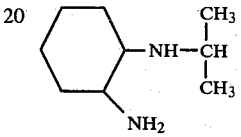
N-isopropyl-1,2-diaminocyclohexane

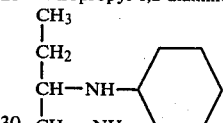
N₂-cyclohexyl-1,2-butanediamine

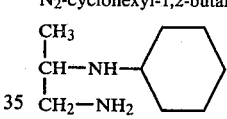
N₂-cyclohexyl-1,2-propanediamine

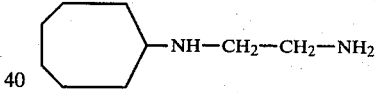
N-cycloheptyl-ethylenediamine

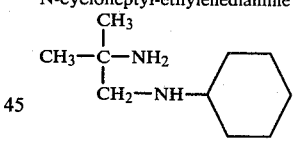
N₁-cyclohexyl-2-methyl-1,2-propanediamine

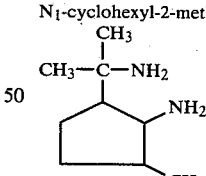
1-(2-aminoisopropyl)-2-amino-3-methyl-cyclopentane

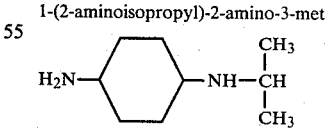
N-isopropyl-1,4-diaminocyclohexane

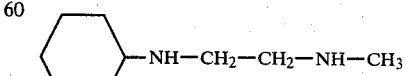
N₁-cyclohexyl-N₂-methyl-ethylenediamine

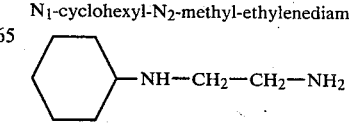

-continued

N-cyclohexyl-ethylenediamine

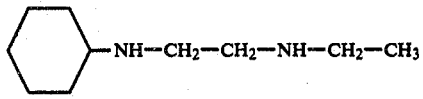

N₁-cyclohexyl-N₂-ethyl-ethylenediamine

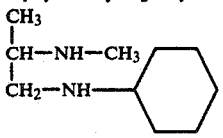

N₁-cyclohexyl-N₂-methyl-1,2-propanediamine

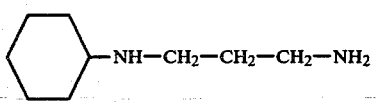

N-cyclohexyl-1,3-propanediamine

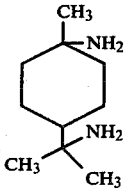

1,8-p-menthanediamine

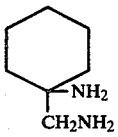

1-amino-1-aminomethylcyclohexane

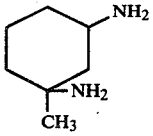

1,3-diamino-1-methylcyclohexane

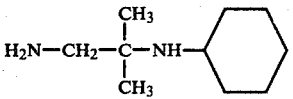

N₂-cyclohexyl-2-methyl-1,2-propanediamine

Biprimary aliphatic diamines in which the nitrogen atoms are separated by up to 5 or more than 6 carbon atoms:

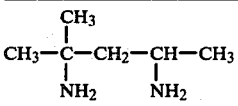

2,4-diamino-2-methylpentane

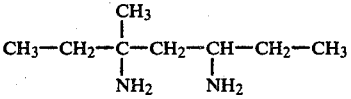

3,5-diamino-3-methylheptane

Disecondary aliphatic diamines:

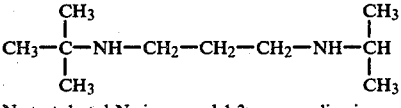

N₁-tert. butyl-N₂-isopropyl-1,3-propanediamine

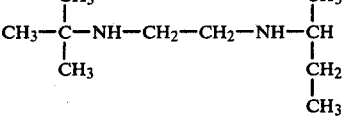

N₁-tert. butyl-N₂-sec. butyl-ethylenediamine

-continued

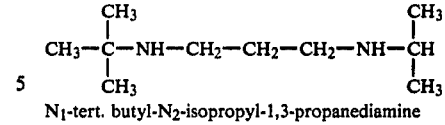

N₁-tert. butyl-N₂-isopropyl-1,3-propanediamine

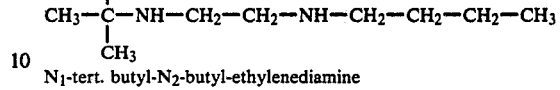

N₁-tert. butyl-N₂-butyl-ethylenediamine

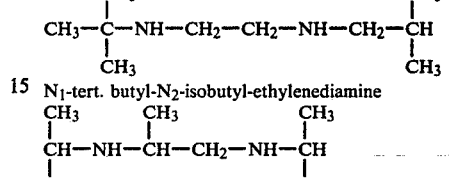

N₁-tert. butyl-N₂-isobutyl-ethylenediamine

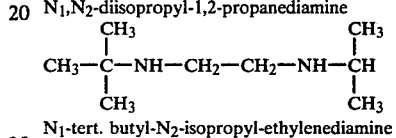

N₁,N₂-diisopropyl-1,2-propanediamine

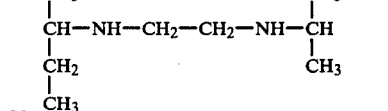

N₁-tert. butyl-N₂-isopropyl-ethylenediamine

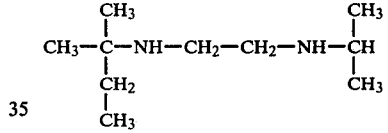

N₁-sec. butyl-N₂-isopropyl-ethylenediamine

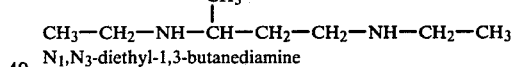

N₁-tert. pentyl-N₂-isopropyl-ethylenediamine

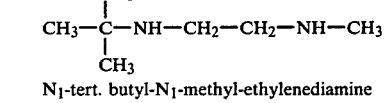

N₁,N₃-diethyl-1,3-butanediamine

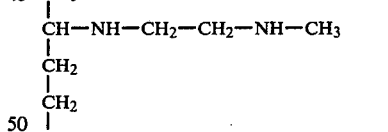

N₁-tert. butyl-N₁-methyl-ethylenediamine

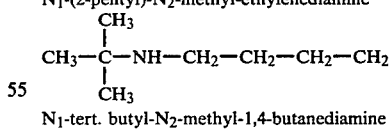

N₁-(2-pentyl)-N₂-methyl-ethylenediamine

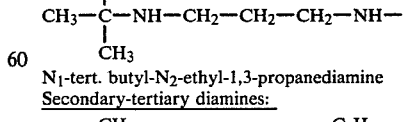

N₁-tert. butyl-N₂-methyl-1,4-butanediamine

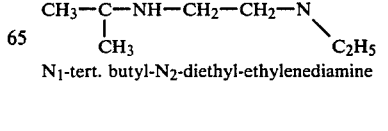

N₁-tert. butyl-N₂-ethyl-1,3-propanediamine

Secondary-tertiary diamines:

$$CH_3-\underset{\underset{CH_3}{|}}{\overset{\overset{CH_3}{|}}{C}}-NH-CH_2-CH_2-N\overset{C_2H_5}{\underset{C_2H_5}{\diagdown}}$$

N₁-tert. butyl-N₂-diethyl-ethylenediamine

Triamines
Cycloaliphatic triamines:

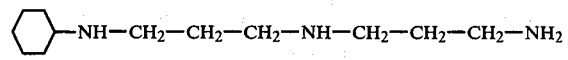

N-cyclohexyl-dipropylene triamine

Aliphatic triamines containing at most one primary amino group:

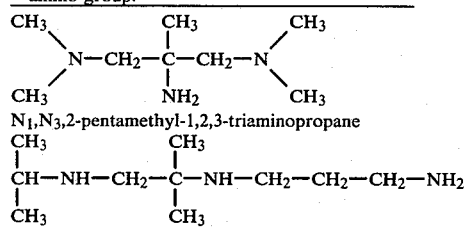

$N_1,N_3$,2-pentamethyl-1,2,3-triaminopropane

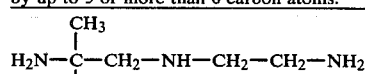

$N_1$-isopropyl-$N_2$-(3-aminopropyl)-2-methyl-1,2-propanediamine

Biprimary or triprimary aliphatic triamines, in which any two vicinal amino groups are separated by up to 5 or more than 6 carbon atoms:

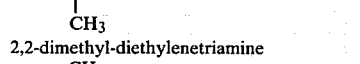

2,2-dimethyl-diethylenetriamine

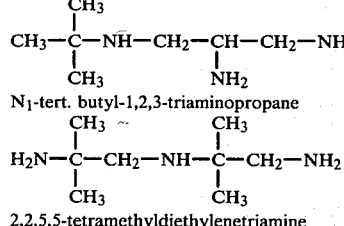

$N_1$-tert. butyl-1,2,3-triaminopropane 2,2,5,5-tetramethyldiethylenetriamine

Aminoalcohols
Cycloaliphatic diaminoalcohols:

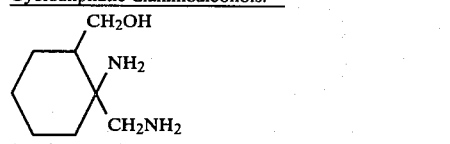

1-amino-1-aminomethyl-2-hydroxymethyl-cyclohexane

N-hydroxyethyl-1,2-diaminocyclohexane

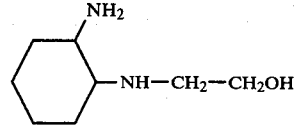

N-cyclohexyl-1,3-diamino-2-propanol

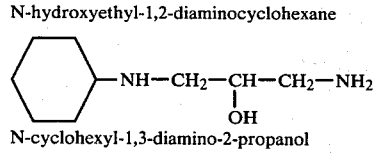

N-(2-hydroxycyclohexyl)-1,3-propanediamine

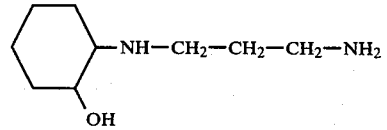

N-isopropanol-1,2-diaminocyclohexane

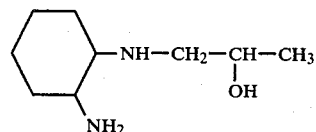

N-(2-hydroxybutyl)-1,4-diaminocyclohexane

Diaminoalcohols containing at most one primary amino group:

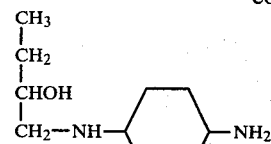

$N_1$(1-hydroxy-2-butyl)-2-methyl-1,2-propanediamine

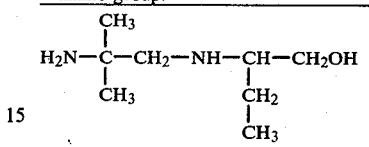

N(1-hydroxy-2-methyl-2-butyl)-1,3-propanediamine

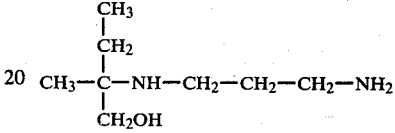

$N_1$(1,1-dimethyl-2-hydroxyethyl)-2-methyl-1,2-propanediamine

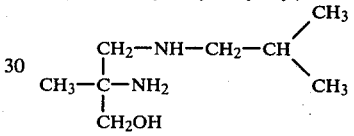

$N_3$-isobutyl-2-methyl-2,3-diamino-1-propanol

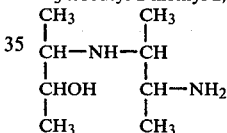

N(3-hydroxy-2-butyl)-2,3-diaminobutane

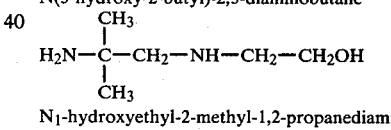

$N_1$-hydroxyethyl-2-methyl-1,2-propanediamine

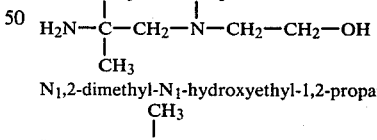

2,$N_3$,$N_3$-trimethyl-2,3-diamino-1-propanol $N_1$,2-dimethyl-$N_1$-hydroxyethyl-1,2-propanediamine

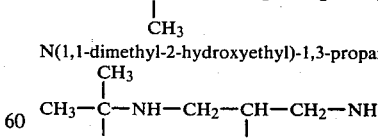

N(1,1-dimethyl-2-hydroxyethyl)-1,3-propanediamine

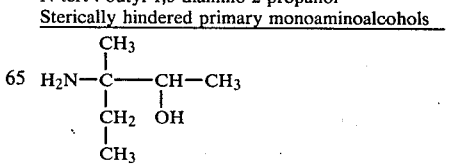

N-tert. butyl-1,3-diamino-2-propanol

Sterically hindered primary monoaminoalcohols

-continued 3-amino-3-methyl-2-pentanol

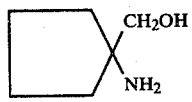
1-hydroxymethyl-cyclopentylamine

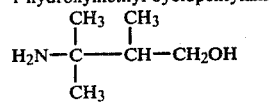
2,3-dimethyl-3-amino-1-butanol

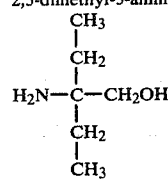
2-amino-2-ethyl-1-butanol

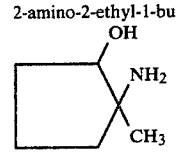
1-methyl-2-hydroxycyclopentylamine

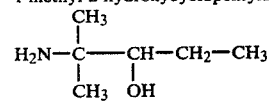
2-amino-2-methyl-3-pentanol

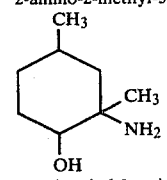
2,4-dimethyl-2-amino cyclohexanol

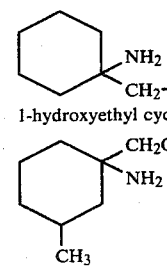
1-hydroxyethyl cyclohexylamine

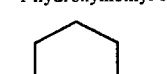
1-hydroxymethyl-3-methyl cyclohexylamine

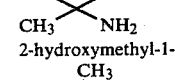
2-hydroxymethyl-1-methyl cyclohexylamine

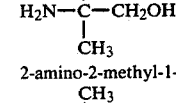
2-amino-2-methyl-1-propanol

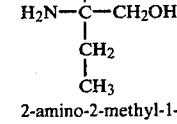
2-amino-2-methyl-1-butanol

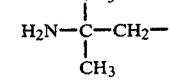

-continued 3-amino-3-methyl-1-butanol

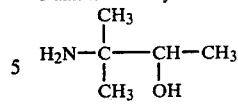
3-amino-3-methyl-2-butanol

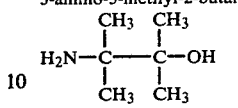
2-amino-2,3-dimethyl-3-butanol

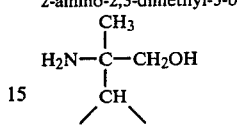
2-amino-2,3-dimethyl-1-butanol

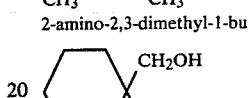
1-hydroxymethyl-cyclohexylamine

Amino ethers
Sterically hindered amino-hydroxyalkyl ethers

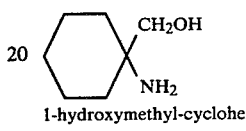
2(2-amino-2-methylpropoxy)-ethanol 2-substituted piperidines

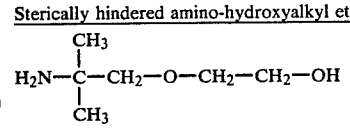
2-piperidine methanol

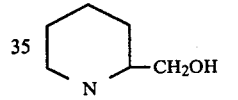
2-piperidine ethanol

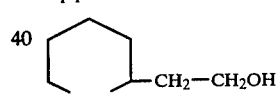
2-(1-hydroxyethyl)-piperidine

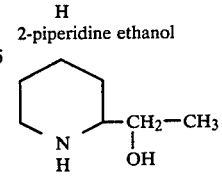
5-hydroxy-2-methyl piperidine

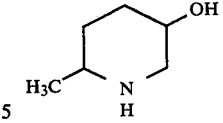
2-methyl-3-hydroxy piperidine

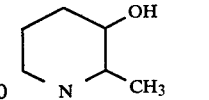
2,6-dimethyl-3-hydroxy piperidine

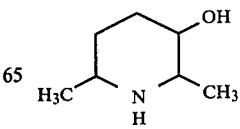

-continued

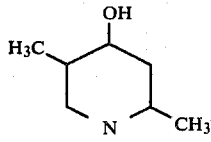
2,5-dimethyl-4-hydroxy piperidine

Piperazine derivatives:

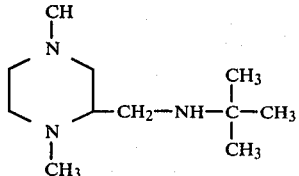
2-tert. butylamino-methyl-1,4-dimethylpiperazine

Azacyclo alkanes

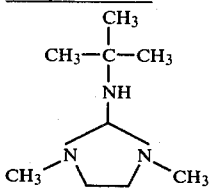
1-tert. butylamino-3,6-dimethyl-3,6-diaza-cycloheptane

Aminoacids

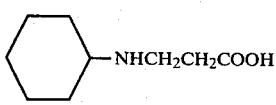
N-cyclohexyl-beta-alanine

The most preferred sterically hindered amines to be used as activators for the alkaline absorbents in the practice of the present invention include: N-cyclohexyl-1,3-propanediamine; 1,8-p-methanediamine; 1,7-bis-sec-butyl-diethylenetriamine; 2,2,5,5-tetramethyl diethylenetriamine; 3-amino-3-methyl-1-butanol; 2-amino-2-methyl-1-propanol; $N_1$-isopropyl-2-methyl-1,2-propanediamine; $N_1$-(1,1-dimethyl-2-hydroxyethyl)-2-methyl-1,2-propanediamine; and $N_1$-isopropyl-$N_2$-(3-aminopropyl)-2-methyl-1,2-propanediamine.

It should be noted that, as used throughout the instant specification, a scrubbing solution which does not comprise the sterically hindered amines promoters as defined above, may comprise a non-sterically hindered amine, e.g., 1,6-hexanediamine, mono- and diethanolamine, etc. A comparison of scrubbing processes utilizing, for example, aqueous $K_2CO_3$ promoted with amines, will show that when a sterically hindered amine is used, a working capacity increase of 20% or greater may be obtained over a non-sterically hindered amine.

The aqueous scrubbing solution used in the practice of the present invention will be comprised of a major proportion of an alkaline material comprising alkali metal salts or alkali metal hydroxides and a minor proportion of the amine activator comprising the sterically hindered amine. The remainder of the solution will be comprised of water and other commonly used additives such as antifoaming agents, antioxidants, corrosion inhibitors, etc. the incorporation of which is within the skill of the artisan. For example, the aqueous scrubbing solutions of the instant invention may comprise arsenious anhydride, selenious and tellurous acid, protides, amino acids, e.g., glycine, vanadium oxides, e.g., $V_2O_3$, chromates, e.g., $K_2Cr_2O_7$, etc.

By practicing the process of the present invention one can operate the process as described above at conditions whereby the thermodynamic cyclic capacity (also referred to as "working capacity") (as determined from the vapor-liquid equilibrium isotherm in the reaction mixture) would be greater, preferably at least 15% greater and more preferably 20 to 60% greater than in an aqueous scrubbing amine activated or promoted potassium carbonate process wherein diethanolamine or 1,6-hexanediamine is the only amine activator utilized under similar conditions of gaseous feed composition, scrubbing solution composition, temperatures and pressures. The thermodynamic cyclic capacity or working capacity for a given $CO_2$ gas scrubbing process is the difference in the moles of $CO_2$ gas absorbed in the solution at the termination of the absorption and desorption steps, based on the moles of the basic alkali metal salt or hydroxide, e.g., $K_2CO_3$ originally present. In other words, working capacity is defined as follows:

$CO_2$ in solution at completion of absorption $-$ $CO_2$ in solution at completion of desorption which is:

$$\left[\frac{\text{Moles of CO}_2 \text{ absorbed}}{\text{Initial moles of K}_2\text{CO}_3}\right] - \left[\frac{\text{Moles residual CO}_2 \text{ absorbed}}{\text{Initial moles of K}_2\text{CO}_3}\right]$$

It should be noted that throughout the specification wherein the terms "working capacity" or "cyclic capacity" are referred to, these terms may be defined as the difference between $CO_2$ loading in solution at absorption conditions (step 1) and the $CO_2$ loading in solution at regeneration conditions (step 2), each divided by the initial moles of $K_2CO_3$ in the scrubbing solution. The term "working capacity" is to be construed as synonymous and relates to the "thermodynamic cyclic capacity", that is the loading is measured at equilibrium conditions. This working capacity may be obtained from the vapor-liquid equilibrium isotherm, that is from the relation between the $CO_2$ pressure in the gas and the acid gas, e.g., $CO_2$ loading in the solution at equilibrium at a given temperature. To calculate thermodynamic cyclic capacity, the following parameters must usually be specified: (1) acid gas, e.g., $CO_2$ absorption pressure, (2) acid gas, e.g., $CO_2$ regeneration pressure, (3) temperature of absorption, (4) temperature of regeneration, (5) scrubbing solution composition, that is, weight percent amine and the weight percent of the alkaline salt or hydroxide, for example, potassium carbonate, and (6) gas composition. The use of these parameters to describe the improved process of the instant invention is documented in the examples below, and in FIGS. 2, 3 and 4. However, the skilled artisan may conveniently demonstrate the improved process which results by use of a sterically hindered amine by a comparison directly with a process wherein the sterically hindered amine is not included as the amine activator or promoter in the aqueous scrubbing solution. For example, it will be found when comparing two similar $CO_2$ scrubbing processes (that is similar gas composition, similar scrubbing solution composition, similar pressure and temperature conditions) that when the sterically hindered amines of the instant invention are utilized as activators or promoters the difference between the amount of CO₂ absorbed at the end of step 1 (absorption step) defined above and step 2 (desorption step) defined above is significantly greater than in an amine activated "hot pot" process wherein the amine activator is diethanolamine or 1,6-hexanediamine. This significantly increased working capacity is observed even when the scrubbing solution that is being compared comprises an equimolar amount of another prior art amine promoter such as diethanolamine or 1,6-hexanediamine. It has been found that the use of the sterically hindered amines of the instant invention gives a thermodynamic cyclic capacity (working capacity) which is at least 15% greater than the working capacity of a scrubbing solution which does not utilize a sterically hindered amine, e.g., diethanolamine as the promoter. Working capacity increases of from 20 to 60% may be obtained by use of the sterically hindered amines of the instant invention.

While not wishing to be bound by theory, it is believed that the use of sterically hindered amines gives the above-described improvements for the following reasons.

When CO₂ is absorbed into an aqueous primary amine solution, the following reactions occur:

$$R-NH_2 + CO_2 \rightarrow R-NH-COO^- + H^+ \quad (1)$$

$$R-NH-COO^- + H_2O \rightarrow R-NH_2 + HCO_3^- \quad (2)$$

$$H^+ + R-NH_2 \rightarrow R-NH_3^+ \quad (3)$$

The amount of CO₂ that can be absorbed depends on the extent of reaction (2). If reaction (2) is negligible, the net result of reactions (1) and (3) will be:

$$2R-NH_2 + CO_2 \rightarrow R-NH-COO^- + R-NH_3^+ \quad (4)$$

i.e., the maximum amount of CO₂ that can be absorbed is 0.5 moles/mole of amine.

On the other hand, if reaction (2) is quantitative, the net result of reactions (1), (2) and (3) will be:

$$R-NH_2 + CO_2 + H_2O \rightarrow HCO_3^- + R-NH_3^+ \quad (5)$$

i.e., the maximum amount of CO₂ that can be absorbed is 1 mole/mole of amine.

The extent of reaction (2) depends on the nature of R, particularly on its steric configuration. If R is a primary alkyl group, the carbamate will be relatively stable and its decomposition, i.e. reaction (2), will be incomplete. The maximum amount of CO₂ that can be absorbed will be only slightly higher than 0.5 mols/mol of amine. On the other hand, if R is a tertiary alkyl group, the carbamate will be very unstable and its decomposition, i.e. reaction (2), will be practically complete. The maximum amount of CO₂ that can be absorbed will be close to 1 mol/mol of amine. Thus, when the amine is sterically hindered, CO₂ absorption is more complete than when it is unhindered.

When desorption is carried out, reactions (1), (2) and (3) go from right to left. If R is a primary alkyl group, the decomposition of the carbamate will be incomplete, i.e., desorption will be only partial. On the other hand, if R is a tertiary alkyl group, there will be no way for CO₂ to be in a stable form and desorption will be practically complete. Therefore, the amount of CO₂ absorbed or desorbed per mole of amine is higher when the amine is sterically hindered.

If the amino group is secondary, a secondary alkyl group attached to it is enough to provide steric hindrance.

A similar explanation can be given for the increase in cyclic capacity that is observed when a sterically hindered amine is used in conjunction with K₂CO₃. In that case, the hydrogen ions formed in reaction (1) react mainly with CO₃⁻⁻ ions, to give bicarbonate ions, rather than being trapped by the amine in reaction (3).

By increasing working capacity and rates of absorption and desorption, the use of sterically hindered amino groups leads to lower steam consumption.

Steam requirements are the major part of the energy cost of operating an acid gas, e.g., CO₂ scrubbing unit. Substantial reduction in energy, i.e., operating costs, will be obtained by the use of the process of the instant invention. Additional savings from new plant investment reduction and debottlenecking of existing plants may also be obtained by the use of sterically hindered amines. The removal of acid gases such as CO₂ from gas mixtures is of major industrial importance, particularly with the systems which utilize potassium carbonate activated by the sterically hindered amines.

The larger-scale applications fall into two categories:

(a) The hydrogen industry, where hydrogen mixed with CO₂ is manufactured from gas, coal or petroleum fractions; large amounts of hydrogen are used in the ammonia industry and the amount of CO₂ to be removed is of the order of 1.2 to 2.2 tons per ton of NH₃.

(b) The gas industry:
(1) Treatment of natural gases containing large concentrations of CO₂.
(2) Upgrading of town gases manufactured from gasification of coal or reforming of petroleum fractions. A medium-size coal gasification plant, producing 250 MM SCF/D of substitute natural gas, requires removal of 7–8,000 tons/day of CO₂.

The invention is illustrated further by the following examples which, however, are not to be taken as limiting in any respect. All parts and percentages, unless expressly stated to be otherwise, are by weight.

The following is a preferred embodiment of the instant invention. The CO₂-containing mixture is contacted in an absorption zone with a solution comprising from about 20 to about 30 weight percent of potassium carbonate and at least 2 weight percent of a sterically hindered amine at a temperature of from 35° to 150° C. and a pressure of from 100 to 500 psig for a period of from 0.1 to 60 minutes, whereby said solution is saturated with CO₂ to a capacity of at least 90%. The solution is then passed to a flash chamber, said flash chamber being maintained at a pressure of from 2 to 10 psig, thereby flashing off at least some of said absorbed acid gas, and then into a regenerator tower whereby said solution is maintained at a temperature of from about 100° to 160° C. and a pressure of from about 2 to 75 psig, whereby the CO₂ content of said solution is reduced to a capacity of less than 25%. Finally, said regenerated solution is passed back to said absorption zone for reuse.

The following are specific embodiments of the instant invention. However, there is no intent to be bound thereby.

EXAMPLE 1

The experimental reaction apparatus is shown in FIG. 1. It is a vessel having a capacity of about 2.5 liters and a diameter of 10 cm, equipped with a heating jacket. The stirrer shaft carries two 3-blade propellers, of which the upper one pushes the liquid downward and the lower one pushes the liquid upward. Pump P₁ removes liquid from the bottom of the reactor and feeds it back to the gasliquid interface through a stainless-steel sparger $S_1$. Vertical baffles further increase the contact between liquid and gas. Thermocouple T permits the reading of the temperature of the liquid. The top of the reflux condenser C is connected to a U-shaped, open-ended manometer M. The apparatus can be evacuated by means of pump $P_2$ through tap $T_1$. Nitrogen and $CO_2$ can be fed to the bottom of the cell through sparger $S_2$, using respectively taps $T_2$ or $T_3$. $CO_2$, coming from a cylinder, goes first through the two 12-1 flasks $F_1$ and $F_2$, acting as ballasts, then through a 3-1 wet test-meter WTM, then through bubbler $B_1$, where it is saturated with water. Hg-bubbler $B_2$ insures that no air is sucked into flask $F_2$.

Constrictions such as narrow tubings and taps have been carefully avoided in the $CO_2$ path. Tap $T_3$, which is the only one inserted in such a path, has a key with large holes (8 mm).

absorbed, the time is taken. At the beginning the absorption is very rapid and more than 13 liters of $CO_2$ is absorbed in the first minute. In total 34.9 liters of $CO_2$ is sucked in 9 minutes. Subtracting the amount of $CO_2$ used to fill the gaseous space, the amount of $CO_2$ absorbed is 32.9 liters, which corresponds to 59.5 g or 1.35 moles. The total $CO_2$ content calculated from the absorption data is 14.8% whereas that found experimentally is 15.0%. Only one phase is present. The pressure is 40 mm Hg.

A number of other amines were tested as $K_2CO_3$ activators in absorption tests using the equipment shown in FIG. 1 and described above. In Table I absorption rates for aqueous $K_2CO_3$ activated with the sterically hindered amines, prior art amine activators and other activated and non-activated systems are given for various molar ratios of $CO_2$ absorbed to initial $K_2CO_3$ (carbonation ratio). In Table II there are shown some further results of the absorption experiments. The $CO_2$ contents calculated from the amount of gas absorbed are in good agreement with the values determined experimentally.

TABLE I $CO_2$ Absorption Rates (moles/hr) In Aqueous $K_2CO_3$ Activated With Various Amines[a]

| Amine Activator | Carbonation Ratio ($CO_2$ absorbed/Initial $K_2CO_3$) | | | | | | | | | | |
|---|---|---|---|---|---|---|---|---|---|---|---|
| | 0.03 | 0.10 | 0.20 | 0.30 | 0.40 | 0.50 | 0.60 | 0.70 | 0.80 | 0.90 | 1.00 |
| None | 36.8 | 5 | 4 | 3.7 | 3.5 | 2.8 | 2 | 1 | — | — | — |
| Diethanolamine | 59 | 23 | 16 | 11 | 11 | 10 | 9 | 6.5 | 3 | — | — |
| Catacarb[b] | 59 | 15 | 12 | 12 | 10 | 8.5 | 6 | 2.5 | — | — | — |
| GV sol'n[c] | 59 | 13.5 | 13 | 12 | 10.5 | 9 | 5.2 | 2 | — | — | — |
| Hexamethylenediamine | 74 | 49 | 27 | 22 | 14 | 11 | 8.5 | 6 | 3 | — | — |
| 4-aminomethyl-piperdine | 74 | 60 | 35 | 24.5 | 17.5 | 15.5 | 13 | 12 | 6.5 | 2 | — |
| N-2-amino ethylpiperazine | 74 | 37 | 31 | 23 | 15 | 13 | 12 | 9 | 6.5 | — | — |
| 1,2-diamino-cyclohexane | 74 | 43 | 35 | 24.5 | 16 | 14 | 12 | 10 | 8 | 2 | — |
| N-cyclohexyl-1,3-propane-diamine | 74 | 74 | 45 | 27 | 20 | 18 | 13 | 9.5 | 6.5 | 3 | — |
| 1,8-p-menthanediamine | 59 | 25 | 23 | 22 | 20 | 18.5 | 15 | 12 | 8.5 | 5 | 7 |
| bis-2-amino-propylamine | 74 | 50 | 42 | 33 | 24.5 | 20 | 16.5 | 12.5 | 10.5 | 7 | 1.5 |
| 1,7-di-sec-butyl-diethylene triamine | 74 | 35 | 31 | 29.5 | 27 | 22.5 | 20.5 | 15 | 11 | 6.5 | — |
| 2,2,5,5-tetramethyl-diethylenetriamine | 74 | 49 | 40 | 22.5 | 20 | 18.5 | 17.5 | 14 | 11 | 8 | 3.7 |
| Tetrapropylene pentamine | 54 | 54 | 50 | 42 | 37 | 31 | 24.5 | 19.7 | 15.5 | 12 | 8.6 |
| Tetraethylene pentamine | 74 | 49 | 49 | 37 | 33 | 28 | 19.7 | 15.5 | 12.5 | 10 | 5.9 |

[a]Experimental conditions: $K_2CO_3$ = 187.5g; amine = 0.35 moles; water to 610 ml; temperature = 80° C. (Rates and carbonation ratios are not corrected for the reactor space occupied by gas).
[b]10% solution of Catacarb 251 H was used.
[c]GV sol'n = Giammarco-Vetrocoke solution ($As_2O_3$ as activator).

DETAILED DESCRIPTION OF ABSORPTION-DESORPTION-REABSORPTION EXPERIMENTS

A. Absorption

The following reagents are charged into the apparatus while bubbling nitrogen through tap $T_2$ and keeping exhaust E open and tap $T_3$ closed.
  56 g of 2,2,5,5-tetramethyldiethylene triamine (0.35 mols)
  187.5 g of $K_2CO_3$ (1.35 mols)
  520 ml of water The total volume is 610 ml. The amine is incompletely soluble in the aqueous phase. The temperature of the liquid is brought to 80° C., pump $P_1$ is regulated so as to suck and feed about 4 liters of liquid per minute, the stirrer is kept turning at 1200 rpm. Exhaust E and tap $T_2$ are closed and the apparatus is evacuated by means of pump $P_2$ until the liquid begins to boil, which occurs when the residual pressure is about 50 mm Hg. Tap $T_1$ is closed. At this point, tap $T_3$ is opened and absorption starts. Simultaneously a timer is started. Every time the wet-test-meter WTM indicates that a liter has been

TABLE II $CO_2$ Absorption in Aqueous $K_2CO_3$ Activated With Various Amines[a]

| Amine | $CO_2$ Absorbed g | Total $CO_2$% After Absorption | |
|---|---|---|---|
| | | Calc. from Absorption | Found |
| None | 42 | 12.6 | 12.6 |
| Diethanolamine | 48 | 13.5 | 13.4 |
| Catacarb[b] | 42 | 12.8 | 12.4 |
| GV Solution[c] | 39.5 | — | 10.7 |
| Hexamethylenediamine | 50.5 | 13.7 | 13.6 |
| 4-aminomethylpiperidine | 54 | 15.2 | 14.8 |
| N-2-aminoethylpiperazine | 51 | 14 | 14 |
| 1,2-diaminocyclohexane | 52 | 14.3 | 13.7 |
| N-cyclohexyl-1,3-propanediamine | 53.5 | 13.8 | 13.8 |
| 1,8-p-menthanediamine | 57.5 | 14.7 | 14.4 |
| bis-2-aminopropylamine | 58.5 | 14.5 | 14.5 |
| 1,7-di-sec-butyl-diethylene-triamine | 55 | 14.4 | 13.9 |
| 2,2,5,5-tetramethyldi-ethylene-triamine | 59.5 | 14.8 | 15 |
| Tetrapropylenepentamine | 67 | 15.7 | 14.6 |

TABLE II-continued

$CO_2$ Absorption in Aqueous $K_2CO_3$ Activated With Various Amines[a]

| Amine | $CO_2$ Absorbed g | Total $CO_2$% After Absorption Calc. from Absorption | Found |
|---|---|---|---|
| Tetraethylenepentamine | 63 | 15.2 | 14.7 |

[a] Experimental Conditions: $K_2CO_3$ = 187.5g; amine = 0.35 moles; $H_2O$ = 610 ml.
[b] 10% solution of Catacarb 251 H was used.
[c] GV sol'n = Giammarco-Vetrocoke solution ($As_2O_3$ as activator).

TABLE III

Influence of Different Amines on Extent of Desorption[a]

| Amine Activator | Total $CO_2$ % Before Desorption | After Desorption | $CO_2$ Desorbed g | Decrease in Carbonation Ratio |
|---|---|---|---|---|
| None | 12.6 | 9.3 | 28.5 | 0.50 |
| Diethanolamine | 13.4 | 9 | 38.5 | 0.65 |
| Catacarb[b] | 12.4 | 8 | 38 | 0.63 |
| Hexamethylenediamine | 13.6 | 9.1 | 39.6 | 0.66 |
| 4-aminomethylpiperidine | 14.8 | 9.9 | 40.5 | 0.68 |
| N-2-aminoethylpiperazine | 13.5 | 8.9 | 40 | 0.67 |
| 1,2-diaminocyclohexane | 13.7 | 9.8 | 33.4 | 0.56 |
| N-cyclohexyl-1,3-propane-diamine | 13.8 | 8.6 | 46.5 | 0.78 |
| 1,8-p-menthanedaimine | 14.4 | 8.3 | 52.5 | 0.88 |
| 1,7-di-sec-butyl-diethylene-triamine | 13.9[c] | 9.2 | 41 | 0.69 |
| bis-2-aminopropylamine | 14.5 | 9.9 | 41 | 0.69 |
| 2,2,5,5-tetramethyldi-ethylene-triamine | 15 | 8.9 | 54 | 0.91 |
|  | 15.5 | 9.1 | 57 | 0.96 |
| Tetrapropylenepentamine | 14.6 | 11 | 32.2 | 0.54 |
| Tetraethylenepentamine | 14.6 | 10.3 | 38.5 | 0.64 |

[a] Experimental Conditions: The reaction mixture obtained after absorption is heated to 105° C. and maintained at this temperature for 1 hour while slowly bubbling $N_2$ through it.
[b] 10% solution of Catacarb 251 H was used.
[c] The values are as reported, however, based on other experiments, it is believed that the "13.9" was due to analytical error since the analysis of the reabsorbed solution is 14.4% $CO_2$, see Table IV.

B. Desorption

Desorption of the amine (2,2,5,5-tetramethyldiethylenetriamine)-activated solution used in the absorption experiment described above in section A is carried out as follows:

Exhaust E is open, taps $T_2$ and $T_3$ are closed. The reaction mixture is brought to 105° C., while stirring slowly and keeping the liquid circulation rate at a minimum. When the temperature reaches 105° C., nitrogen is blown from tap $T_2$ through sparger $S_2$ at a rate of 1 mole/hr. A sample of liquid is taken after 60 minutes. The total $CO_2$ content is 8.9%, corresponding to 54 g of $CO_2$ desorbed. A small amount of non-aqueous phase is present.

Table 3 shows the results of desorptions for 2,2,5,5-tetramethyldiethylenetriamine and various other amine activated solutions.

It can be seen from Table III that the sterically hindered amine activated solutions are clearly better than the sterically non-hindered amine activated solutions. None of the other amines (sterically non-hindered) contain sterically hindered amino groups. It is to be noted that a large absorption capacity for a scrubbing solution does not necessarily mean a large desorption. For example, by comparing Tables II and III with one another, it can be seen that bis-2-aminopropylamine, tetrapropylenepentamine and tetraethylenepentamine lead to a very high absorption but to a rather poor desorption. The fact that they contain many nitrogen atoms enables them to absorb a large amount of $CO_2$, but, as the nitrogen atoms are not of the right kind, $CO_2$ desorption is incomplete. Use of absorption alone as a means of screening amines, a widely used procedure, can be very misleading.

C. Reabsorption

The desorbed reaction mixture as described above (Section B) for the 2,2,5,5-tetramethyldiethylenetriamineactivated solution is brought back to 80° C., while still blowing nitrogen, the stirrer and pump $P_1$ are regulated in the same way as for the absorption. Exhaust E and tap $T_2$ are closed and the apparatus is evacuated by means of pump $P_2$, until the liquid begins to boil, which occurs when the residual pressure is about 60 mm Hg. Tap $T_1$ is closed. Tap $T_3$ is opened and reabsorption starts. Simultaneously the timer is started. Times are taken as during absorption. More than 10 liters of $CO_2$ are consumed in the first minute. In total, 30 liters of $CO_2$ is sucked in 9 minutes. Subtracting the amount of $CO_2$ used to fill the gaseous space, the amount of $CO_2$ reabsorbed is 28 liters, corresponding to 51 g or 1.15 moles. The total $CO_2$ content is 15.5%. The pressure is 32 mm Hg.

Table IV shows the amounts of $CO_2$ reabsorbed in the presence of various amine activators including 2,2,5,5-tetramethyldiethylenetriamine. It can be seen that the sterically hindered amines are the best performers. In Table V reabsorption rates in the presence of various amine activators are shown for various molar ratios of $CO_2$ reabsorbed to initial $K_2CO_3$. Again, the sterically hindered amine activators are the best performers.

TABLE IV

$CO_2$ Reabsorption In The Presence of Various Amines[a]

| Amine Activator | $CO_2$ Reabsorbed g. | Increase in Carbonation Ratio | Total $CO_2$ % Before Reabsorption | Total $CO_2$ % After Reabsorption | $CO_2$ Reabsorbed g, calc from $CO_2$ Analysis |
|---|---|---|---|---|---|
| None | 27 | 0.52 | 9.3 | 12.5 | 28.4 |
| Diethanolamine | 35.5 | 0.60 | 9 | 13 | 34 |
| Catacarb[b] | 38 | 0.64 | 8 | 12.1 | 35.2 |
| GV sol'n[c] | 35.2 | 0.59 | 6.8 | 10.7 | — |
| Hexamethylene-diamine | 38 | 0.64 | 9.1 | 13.7 | 40.5 |
| 4-aminomethylpiperidine | 40 | 0.67 | 9.9 | 15.1 | 43 |
| N-2-aminoethylpiperazine | 40 | 0.67 | 8.9 | 13.7 | 42 |
| 1,2-diamino-cyclohexane | 37.4 | 0.63 | 9.8 | 13.9 | 35.2 |
| N-cyclohexyl-1,3-propane-diamine | 45.5 | 0.76 | 9.1 | 12.9 | 46.5 |
| 1,8-p-menthanediamine | 53.5 | 0.90 | 8.3 | 14 | 52.6 |
| bis-2-aminopropylamine | 40.5 | 0.68 | 9.9 | 14.6 | 42.4 |
| 1,7-di-sec-butyl diethylenetriamine | 45 | 0.76 | 9.2 | 14.4 | 45.4 |
| 2,2,5,5-tetramethyl-diethylenetriamine | 50.5 | 0.85 | 8.9 | 15.5 | 58.5 |
| Tetraethylene pentamine | 37.5 | 0.63 | 10.3 | 14.6 | 38.4 |

[a]Experimental Conditions: The reaction mixture obtained after desorption is cooled back to 80° C.
[b]10% solution of Catacarb 251 H was used.
[c]GV sol'n = Grammarco-Vetrocoke solution ($As_2O_3$ as activator).

TABLE V

$CO_2$ Reabsorption Rates (moles/hr) in Aqueous $K_2CO_3$ Activated With Various Amine Activators[a]

| Amine Activator | \multicolumn{9}{c}{$CO_2$ Reabsorbed/Initial $K_2CO_3$ (Ratio)} | | | | | | | | |
|---|---|---|---|---|---|---|---|---|---|
|  | 0.03 | 0.10 | 0.20 | 0.30 | 0.40 | 0.50 | 0.60 | 0.70 | 0.80 |
| None | 29.5 | 3.7 | 3.3 | 3.0 | 1.8 | .5 | — | — | — |
| Diethanolamine | 59 | 14.0 | 10.5 | 9.5 | 8.0 | 6 | 2.5 | — | — |
| Catacarb[b] | 59 | 13.5 | 12 | 10.5 | 9 | 6 | 3.2 | — | — |
| GV sol'n[c] | 59 | 14 | 12.5 | 11.8 | 10 | 7.5 | 2.7 | — | — |
| Hexamethylenediamine | 42.5 | 13.5 | 10.5 | 10.5 | 10 | 7.5 | 5.0 | — | — |
| 4-amino-methyl-piperidine | 59 | 17.5 | 14.5 | 14 | 11 | 9 | 5.2 | 1.5 | — |
| N-2-aminoethylepiperazine | 74 | 21 | 13.5 | 13.3 | 12.5 | 11 | 7 | 2.2 | — |
| 1,2-diaminocyclohexane | 59 | 20 | 15.5 | 13.5 | 11.8 | 9 | 4.9 | — | — |
| N-cyclohexyl-1,3-propane-diamine | 74 | 32 | 26 | 21 | 15.5 | 11.5 | 7.5 | 4.9 | — |
| 1,8-p-menthanediamine | 49 | 25.5 | 21 | 18.5 | 17.5 | 13.5 | 10.5 | 6.5 | 3.5 |
| bis-2-aminopropylamine | 59 | 23 | 18 | 15.5 | 14 | 11.5 | 6.4 | 4.4 | — |
| 1,7-bis-sec-butyl-diethylenetriamine | 59 | 29.5 | 24.6 | 21 | 18.5 | 16 | 11.3 | 7.6 | 1 |
| 2,2,5,5-tetramethyldi-ethylenetriamine | 74 | 26 | 20 | 17.5 | 15 | 13.6 | 8 | 7.8 | 5 |
| Tetraethylenepentamine | 59 | 24 | 17.5 | 14 | 11 | 8 | 4 | — | — |

[a]Experimental Conditions: The reaction mixture obtained after desorption is cooled back to 80° C. (Rates and carbonation ratios are not corrected for the reactor space occupied by gas.)
[b]10% solution of Catacarb 251 H was used.
[c]GV sol'n = Giammarco-Vetrocoke solution ($As_2O_3$ as activator).

In Table VI, the amounts of $CO_2$ desorbed and reabsorbed in the presence of various amines are compared. It is clear that the amount of $CO_2$ that can be desorbed or reabsorbed is higher in the case of sterically hindered amines than in the case of Catacarb (a commercially available $CO_2$ scrubbing solution), diethanolamine or tetraethylene pentamine.

In Table VII, the results of similar experiments are reported, in which the molar amount of amine was twice that used in the experiments of Table VI. Again, the amounts of $CO_2$ desorbed or reabsorbed are higher in the case of the sterically hindered amines. Comparison of Table VI with Table VII shows that, in the case of the sterically unhindered amines, i.e. diethanolamine, 1,6-hexanediamine and tetraethylenepentamine, essentially the same amounts of $CO_2$ are desorbed or reabsorbed, regardless of amine concentration or number of amino groups. On the other hand, doubling the concentration of N-cyclohexyl-1,3-propanediamine leads to an increase in the amount of $CO_2$ desorbed or reabsorbed.

TABLE VI

Comparison of $CO_2$ Desorption-Reabsorption Experiments In Aqueous $K_2CO_3$ Activated With Various Amines[a]

| Amine Activator | g. $CO_2$ desorbed | g. $CO_2$ reabsorbed |
|---|---|---|
| None | 28.5 | 27 |
| Diethanolamine | 38.5 | 35.5 |
| Catacarb (10% sol'n) | 38 | 38 |
| Tetraethylene Pentamine | 38.5 | 37.5 |
| N-cyclohexyl-1,3-propane-diamine | 46.5 | 45.5 |
| 1,8-p-menthanediamine | 52.5 | 53.5 |
| 1,7-bis-sec. butyl-diethylenetriamine | 41 | 45 |
| 2,2,5,5-tetramethyl- | 55.5 | 50.5 |

TABLE VI-continued
Comparison of $CO_2$ Desorption-Reabsorption Experiments In Aqueous $K_2CO_3$ Activated With Various Amines[a]

| Amine Activator | g. $CO_2$ desorbed | g. $CO_2$ reabsorbed |
|---|---|---|
| diethylenetriamine | | |

[a]Experimental Conditions: $K_2CO_3$ = 187.5g (1.35 mols); Amine = 0.35 mols; $H_2O$ to 610 ml.

TABLE VII
Comparison of $CO_2$ Desorption-Reabsorption Experiments in Aqueous $K_2CO_3$ Activated With Various Amines[a]

| Amine Activator | g. $CO_2$ desorbed | g. $CO_2$ reabsorbed |
|---|---|---|
| Diethanolamine | 37.6 | 37 |
| Hexamethylenediamine | 33.5 | 35 |
| N-cyclohexyl-1,3-propanediamine | 54 | 53 |
| 3-amino-3-methyl-1-butanol | 46 | 45 |

[a]Experimental Conditions: $K_2CO_3$ = 187.5g (1.35 mols); Amine = 0.70 mols; $H_2O$ to 610 ml.

The reabsorption test described above is carried out using Catacarb and N-cyclohexyl-beta-alanine, respectively as amine activators for the potassium carbonate solution. The results of this test are shown in Table VIII.

TABLE VIII
$CO_2$ Reabsorptions
The initial solutions contained 30 wt. % $K_2CO_3$
Initial volume: 610 ml.; T = 80° C.; P = 1 atm.

| Amine Activator, wt. | g. $CO_2$ reabsorbed |
|---|---|
| Catacarb, 75g | 36 |
| N-cyclohexyl-beta-alanine, 120g | 46 |

EXAMPLE 2

Figure 2:
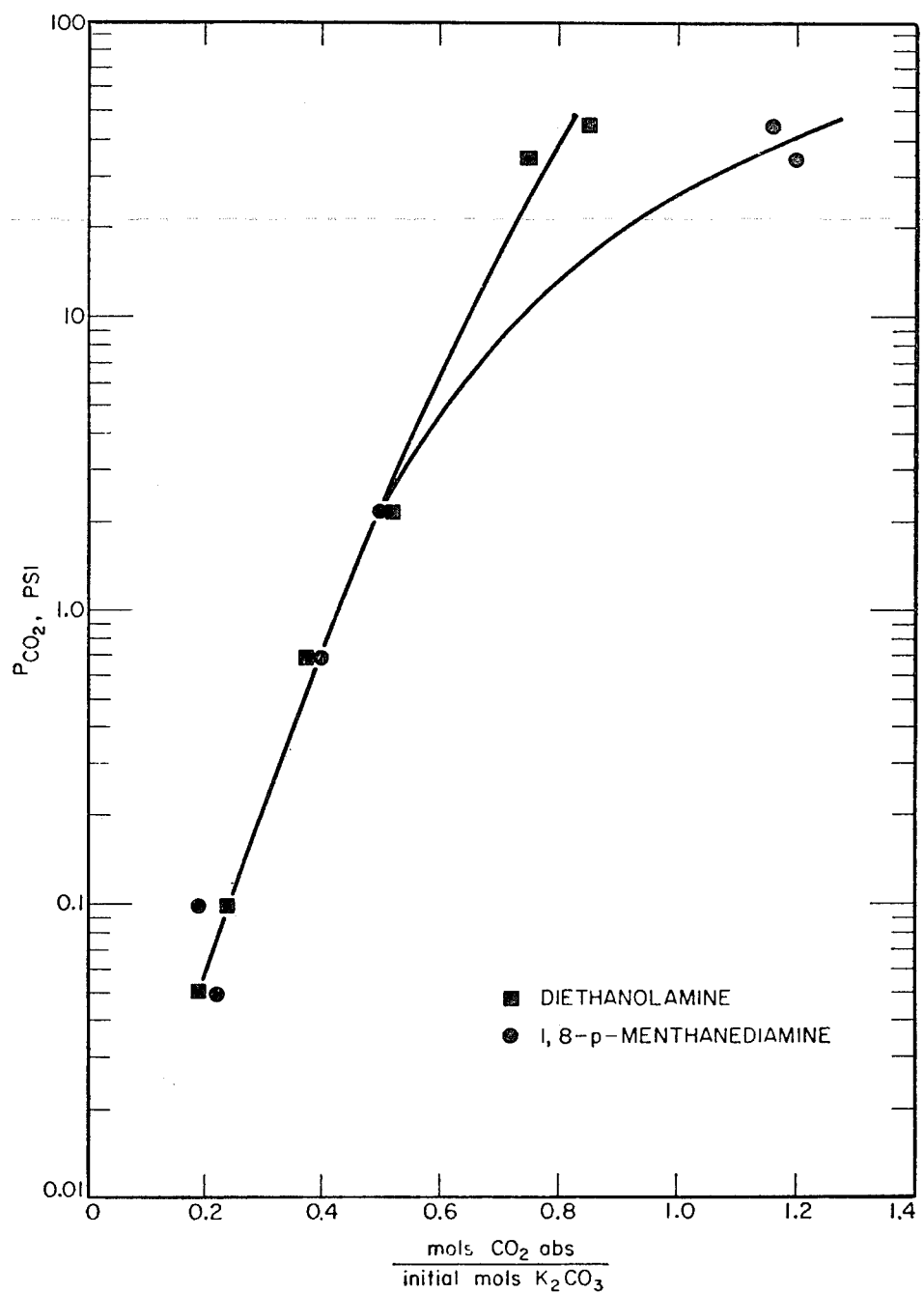
FIG. 2 graphically illustrates the vapor-liquid equilibrium isotherms for potassium carbonate solutions activated by equal total nitrogen contents of diethanolamine (prior art amine activator) and 1,8-p-menthane diamine (a sterically hindered amine activator of the invention) at 250° F. (121.1° C.) wherein the $CO_2$ partial pressure is a function of the carbonate conversion.
Figure 3:
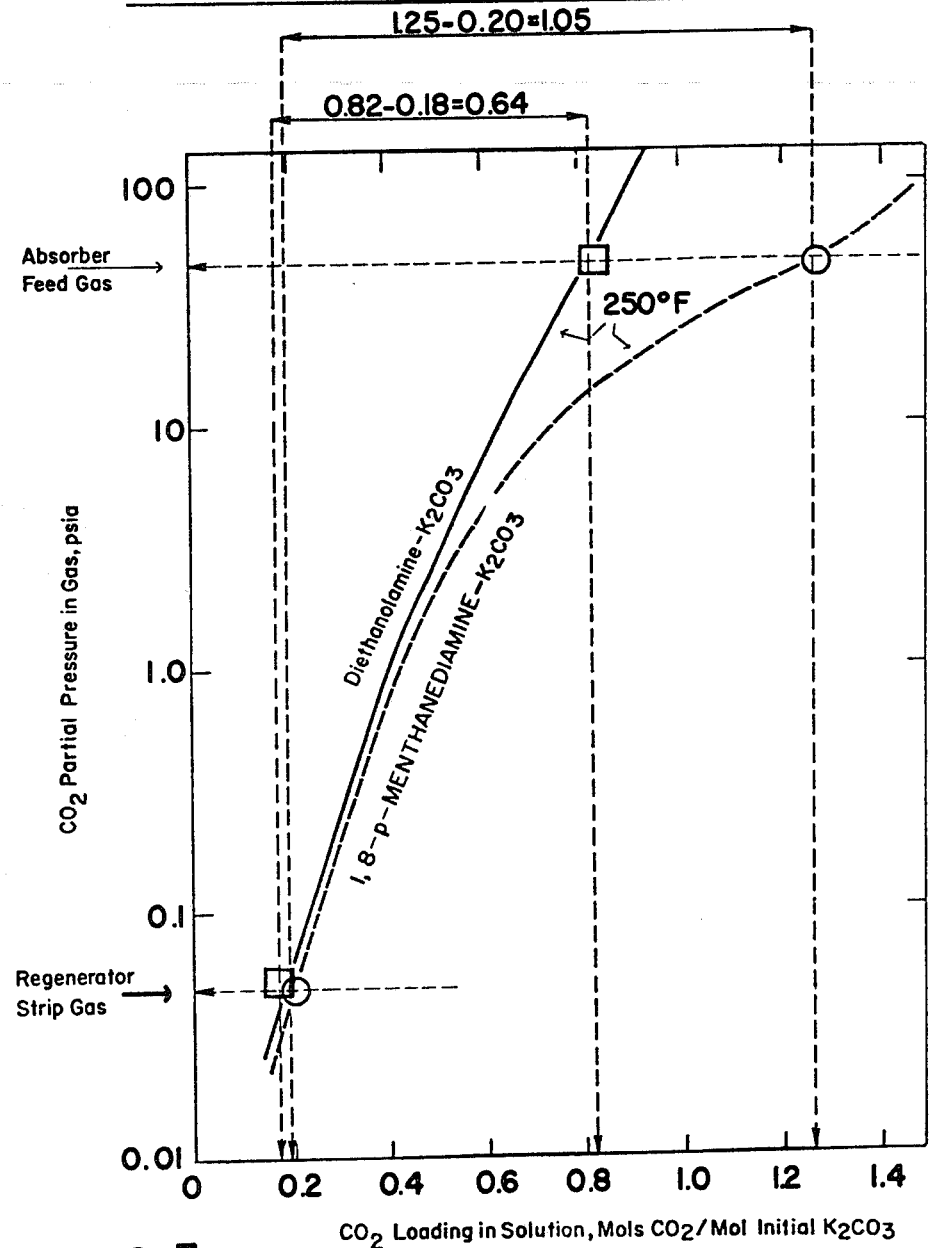
FIG. 3 graphically illustrates the vapor-liquid equilibrium isotherms for amine-promoted $K_2CO_3$ scrubbing solutions illustrating the calculation of thermodynamic cyclic capacity of systems shown in FIG. 2, i.e., potassium carbonate solutions activated by equal nitrogen contents of diethanolamine (prior art amine activator) and 1,8-p-menthane-diamine (a sterically hindered amine activator of the invention) at 250° F. (121.1° C.) wherein the $CO_2$ partial pressure is a function of the carbonate conversion.
Figure 4:
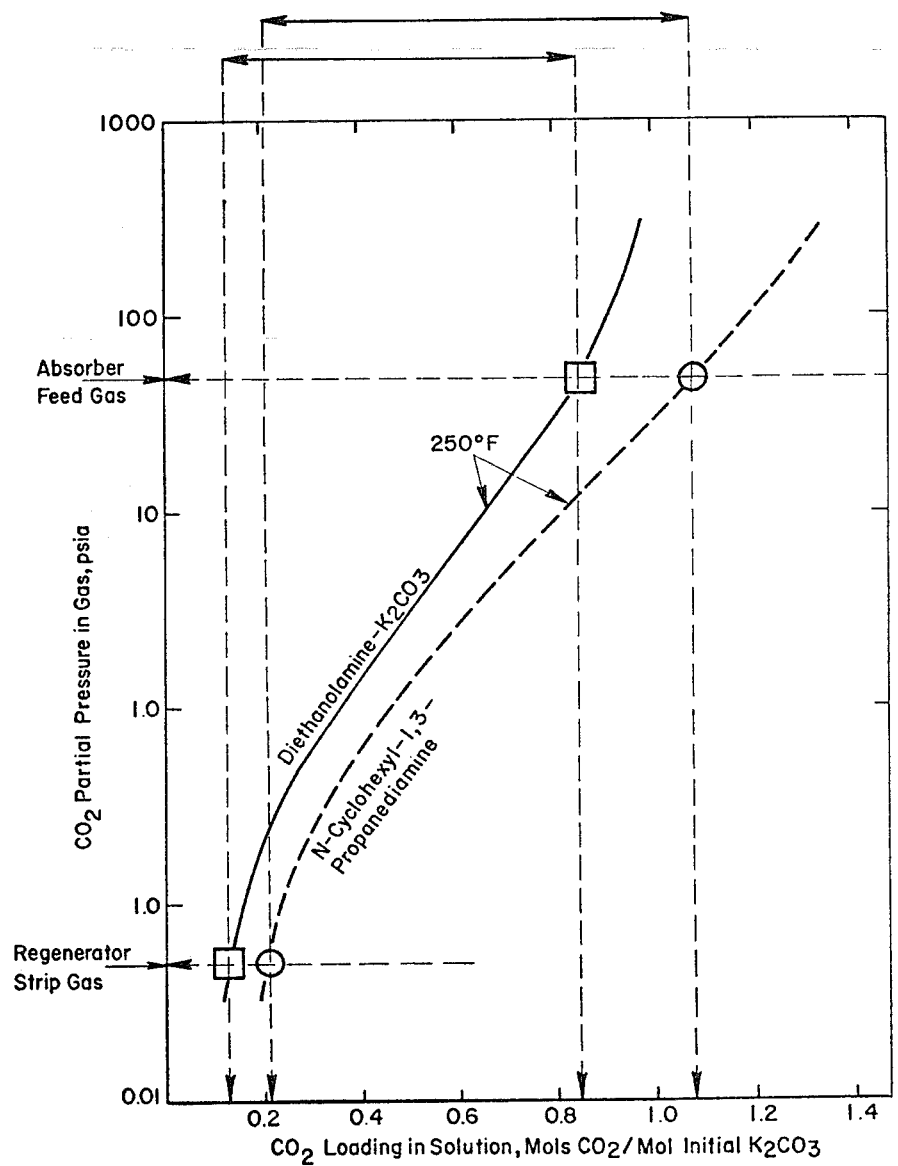
FIG. 4 graphically illustrates the vapor-liquid equilibrium isotherms for potassium carbonate solutions activated by equal total nitrogen contents of diethanolamine (prior art amine activator) and N-cyclohexyl-1,3-propanediamine (a sterically hindered amine activator of the invention) at 250° F. (121.1° C.) wherein the $CO_2$ partial pressure is a function of the carbonate conversion.

Some vapor-liquid equilibrium measurements were carried out to confirm that sterically hindered amines lead to a broadening of cyclic capacity owing to a shift in the equilibrium position. In FIGS. 2 and 3 the equilibrium pressure as a function of carbon conversion at 250° F. is shown for diethanolamine and for 1,8-p-methanediamine and N-cyclohexyl-1,3-propanediamine-promoted potassium carbonate solutions at equal total nitrogen content. It is clear that at low $P_{CO_2}$ values, the carbonation ratios are very close to each other in the case of 1,8-p-methanediamine, whereas at high $P_{CO_2}$ values the carbonation ratio is considerably higher for 1,8-p-methanediamine and the N-cyclohexyl-1,3-propanediamine-promoted solutions. In the $P_{CO_2}$ interval from 0.05 psi to 50 psi defining the typical pressure range, the difference in the carbonation ratios corresponding to high and low $P_{CO_2}$ (working capacity) is about 50% larger in the case of the 1,8-p-methanediamine promoted solution. The experimental measurement of these data is described below.

The reaction apparatus is a 1-liter autoclave equipped with inlet and outlet tube for gases. The following reagents are charged:
41 g of 1,8-p-methanediamine
125 g of potassium carbonate
334 g of water
The autoclave is brought to 250° F. and a gas mixture containing 20% of $CO_2$ and 80% of He is slowly blown through the liquid at a pressure of 200 psi. This is continued until the outgoing gas has the same composition as the entering gas, i.e., 20% $CO_2$. At this point equilibrium between liquid and gas has been reached. A liquid sample is taken and analyzed for total $CO_2$ and for K. The result is 16.4% $CO_2$ and 13.1% K. The carbonation ratio, i.e., the molar ratio of $CO_2$ absorbed to initial $K_2CO_3$ is 1.17.

The experiment is repeated, this time using a $CO_2$-He mixture containing 0.2% $CO_2$ and operating at 50 psi. After reaching equilibrium, analysis of the liquid phase gives a total $CO_2$ content of 9.7% and a K content of 13.8%, from which a carbonation ratio of 0.22 is calculated. More experiments are carried out under both sets of conditions. The variation of carbonation ratio between the high-pressure, high-$CO_2$ experiments and the low-pressure, low-$CO_2$ experiments is about 0.95.

If the above experiments are repeated after replacing 1,8-p-menthanediamine with a double molar amount of diethanolamine, so as to have the same nitrogen concentration, the variation in carbonation ratio is only about 0.66. The working capacity advantage of 1,8-p-menthanediamine is quite evident.

In Table IX, the results of the above experiments and of others carried out under the same conditions are compared. The initial concentration of $K_2CO_3$ was 25% by weight and the total nitrogen content was 0.47 g atoms. It is clear that the two non-sterically hindered amines, namely diethanolamine and 1,6-hexanediamine, have lower working capacity than the sterically hindered 1,8-p-methanediamine, N-cyclohexyl-1,3-propanediamine and 2-amino-2-methyl-1-propanol.

In Table X, results of other equilibrium experiments are given where the $K_2CO_3$ concentration was again 25% and the total nitrogen content was 0.94 g atoms, i.e. double the concentration used for the experiments of Table IX. Again, the sterically hindered N-cyclohexyl-1,3-propanediamine gives a 50% higher working capacity than the sterically unhindered hexamethylenediamine.

TABLE IX
Equilibrium Experiments in the Presence of Various Amines[a]

| Amine Activator | 0.2% $CO_2$ in gas 50 psi | 20% $CO_2$ in gas 250 psi | Difference |
|---|---|---|---|
| Diethanolamine | 0.19 | 0.85 | 0.66 |
| 1,6-hexamethylenediamine | 0.25 | 0.96 | 0.71 |
| 1,8-p-menthanediamine | 0.22 | 1.17 | 0.95 |
| N-cyclohexyl-1,3-propanediamine | 0.26 | 1.12 | 0.86 |
| 2-amino-2-methyl-1-propanol | 0.15 | 1.08 | 0.93 |
| 2,2,5,5-tetramethyldiethylenetriamine (TMDET) | 0.12 | 0.97 | 0.85 |

[a]Experimental Conditions: $K_2CO_3$ = 125g; nitrogen content of activator = 0.47g atoms; total weight of solution = 500g; temperature = 250° F.

TABLE X
Vapor-Liquid Equilibrium Experiments[a]

| Amine Activators | Carbonation Ratios | | |
|---|---|---|---|
| | 0.2% $CO_2$ in gas 50 psig | 20% $CO_2$ in gas 250 psig | Difference (working capacity) |
| 1,6-hexamethylenediamine | 0.44 | 1.17 | 0.73 |
| N-cyclohexyl-1,3-propanediamine | 0.26 | 1.37 | 1.11 |

[a]Experimental conditions $K_2CO_3$ = 125g; nitrogen content of activator = 0.94 g. atoms; total weight of solution = 500g; temperature = 250° F.

Comparison of Table IX and Table X shows that an increase in concentration of a sterically unhindered amine does not lead to a variation of working capacity, whereas it does in the case of a sterically hindered amine. As a consequence, when comparing a sterically hindered and a sterically unhindered amine with one another, it is not necessary to have the same nitrogen concentration, at least within certain limits. In the case of 2,2,5,5-tetramethyldiethylenetriamine at a total nitrogen concentration of 0.70 g atoms, used in combination with 25 wt. % $K_2CO_3$, the working capacity is 0.85.

Further vapor-liquid equilibrium experiments with sterically hindered amines and sterically unhindered amine activators for potassium carbonate scrubbing solutions are performed as described above. The results of these experiments are summarized in Table XI and Table XII. The data in these tables further illustrate that the use of the sterically hindered amines as potassium carbonate activators significantly improves the working capacity of the scrubbing solution.

TABLE XI

Vapor-Liquid Equilibrium Experiments[a]

| Amine Activator[b] | 0.2% $CO_2$ in gas 50 psi | 20% $CO_2$ in gas 250 psi | Difference (working capacity) |
|---|---|---|---|
| Diethanolamine | 0.18 | 0.92 | 0.74 |
| 2-amino-2-methyl-1-propanol | 0.13 | 1.07 | 0.94 |

[a]Experimental Conditions: $K_2CO_3$ = 150g; amount of amine activator = 0.47 mols; total weight = 500g; temperature = 250° F.

TABLE XII

Vapor-Liquid Equilibrium Experiments[a]

| Amine Activator[b] | 0.2% $CO_2$ in gas 50 psi | 20% $CO_2$ in gas 200 psi | Difference (working capacity) |
|---|---|---|---|
| 1,6-hexamethylene-diamine | 0.25 | 0.96 | 0.71 |
| $N_1$-(1,1-dimethyl-2-hydroxyethyl)-2-methyl-1,2-propanediamine | 0.13 | 1.04 | 0.91 |

[a]Experimental Conditions: $K_2CO_3$ = 125g; amount of amine activator = 0.235 mols; total weight = 500g; temperature = 250° F.

GENERAL

It can be seen from the above experimental data that the use of sterically hindered amines broadens the working capacity of aqueous $K_2CO_3$ scrubbing solutions and increases the rates of $CO_2$ absorption and reabsorption. Sterically hindered amine activated $K_2CO_3$ solutions should lead to lead heats of $CO_2$ desorption than their sterically unhindered amine counterparts and this should lead to appreciable steam savings.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A composition comprising an aqueous solution which comprises (1) 10 to about 40 weight percent of an alkaline material selected from the group consisting of a basic alkali metal salt or alkali metal hydroxide, and (2) at least 2 weight percent of at least one sterically hindered amine, wherein said sterically hindered amine is defined as containing at least one secondary amino group attached to either a secondary or tertiary carbon atom or a primary amine group attached to a tertiary carbon atom and selected from the group consisting of: aminoethers, aminoalcohols, di- and triamines.

2. The composition of claim 1 wherein said alkaline material is potassium carbonate.

3. The composition of claim 2 wherein the potassium carbonate is present in an amount ranging from about 20 to about 30 weight percent.

4. The composition of claim 1 wherein the sterically hindered amine is selected from the group consisting of:
$N_1$-tert.butyl-1,4-pentanediamine;
$N_2$-isopropyl-4-methyl-2,4-pentanediamine;
$N_1$-isopropyl-2-methyl-1,2-butanediamine
2-ethylamino-2-methyl-4-aminopentane;
N-tert.pentyl-1,4-butanediamine;
N-tert.butyl-1,5-pentanediamine;
$N_2$-isopropyl-2-methyl-1,2-propanediamine;
N-sec.butyl-1,3-propanediamine;
$N_1$-dimethyl-1,2-diamino-2-methylbutane;
N-t-butyl-ethylenediamine;
N-t-butyl-1,3-propanediamine;
2-methylamino-2-methyl-4-amino pentane;
$N_1$-t-butyl-2-methyl-1,2-propanediamine;
$N_1$-butyl-2-methyl-1,2-propanediamine;
N-sec.butyl-2-methyl-1,3-propanediamine;
$N_1$-propyl-2-methyl-1,2-propanediamine;
$N_1$-sec.butyl-2-methyl-1,2-propanediamine;
N-t-butyl-1,4-butanediamine;
$N_2$-ethyl-1,2-hexanediamine;
1-methyl-1-phenyl ethylenediamine;
2-benzyl-1,2-propanediamine;
1-phenyl-1(2-amino-ethylamino)-propane;
$N_1$-methyl-2-phenyl-1,2-butanediamine;
$N_1$-cyclohexyl-1,2-propanediamine;
1-amino-1-(2-amino-isopropyl)-cyclohexane;
1-methylamino-1-aminomethyl-cyclopentane;
1-amino-1-aminomethylcycloheptane;
N-isopropyl-1,2-diaminocyclohexane;
$N_2$-cyclohexyl-1,2-butanediamine;
$N_2$-cyclohexyl-1,2-propanediamine;
N-cycloheptyl-ethylenediamine;
$N_1$-cyclohexyl-2-methyl-1,2-propanediamine;
1-(2-aminoisopropyl)-2-amino-3-methylcyclopentane;
N-isopropyl-1,4-diaminocyclohexane;
$N_1$-cyclohexyl-$N_2$-methyl-ethylenediamine;
N-cyclohexyl-ethylenediamine;
$N_1$-cyclohexyl-$N_2$-ethyl-ethylenediamine;
$N_1$-cyclohexyl-$N_2$-methyl-1,2-propanediamine;
N-cyclohexyl-1,3-propanediamine;
1,8-p-menthanediamine;
1-amino-1-aminomethylcyclohexane;
1,3-diamino-1-methylcyclohexane;
$N_2$-cyclohexyl-2-methyl-1,2-propanediamine;
2,4-diamino-2-methylpentane;
3,5-diamino-3-methylheptane;
$N_1$-tert.butyl-$N_2$-isopropyl-1,3-propanediamine;
$N_1$-tert.butyl-$N_2$-sec.butyl-ethylenediamine;
$N_1$-tert.butyl-$N_2$-isopropyl-1,3-propanediamine;
$N_1$-tert.butyl-$N_2$-butyl-ethylenediamine;

N₁-tert.butyl-N₂-isobutyl-ethylenediamine;
N₁,N₂-diisopropyl-1,2-propanediamine;
N₁-tert.butyl-N₂-isopropyl-ethylenediamine;
N₁-sec.butyl-N₂-isopropyl-ethylenediamine;
N₁-tert.pentyl-N₂-isopropyl-ethylenediamine;
N₁,N₃-diethyl-1,3-butanediamine;
N₁-tert.butyl-N₂-methyl-ethylenediamine;
N₁-(2-pentyl)-N₂-methyl-ethylenediamine;
N₁-tert.butyl-N₂-methyl-1,4-butanediamine;
N₁-tert.butyl-N₂-ethyl-1,3-propanediamine;
N₁-tert.butyl-N₂,N₂-diethyl ethylenediamine;
N₁-cyclohexyl-dipropylene triamine;
N₁,N₃,2-pentamethyl-1,2,3-triaminopropane;
N₁-isopropyl-N₂-(3-aminopropyl)-2-methyl-1,2-propanediamine;
2,2-dimethyl-diethylenetriamine;
N₁-tert.butyl-1,2,3-triaminopropane;
2,2,5,5-tetramethyldiethylenetriamine;
1-amino-1-aminomethyl-2-hydroxymethylcyclohexane;
N-hydroxyethyl-1,2-diaminocyclohexane;
N-cyclohexyl-1,3-diamino-2-propanol;
N-(2-hydroxycyclohexyl)-1,3-propanediamine;
N-isopropanol-1,2-diaminocyclohexane;
N-(2-hydroxybutyl)-1,4-diaminocyclohexane;
N₁(1-hydroxy-2-butyl)-2-methyl-1,2-propanediamine;
N(1-hydroxy-2-methyl-2-butyl)-1,3-propanediamine;
N₁(1,1-dimethyl-2-hydroxyethyl)-2-methyl-1,2-propanediamine;
N₃-isobutyl-2-methyl-2,3-diamino-1-propanol;
N(3-hydroxy-2-butyl)-2,3-diaminobutane;
N₁-hydroxyethyl-2-methyl-1,2-propanediamine;
2,N₃,N₃-trimethyl-2,3-diamino-1-propanol;
N₁2-dimethyl-N₁-hydroxyethyl-1,2-propanediamine;
N(1,1-dimethyl-2-hydroxyethyl)-1,3-propanediamine;
N-tert.butyl-1,3-diamino-2-propanol;
3-amino-3-methyl-2-pentanol;
1-hydroxymethyl-cyclopentylamine;
2,3-dimethyl-3-amino-1-butanol;
2-amino-2-ethyl-1-butanol;
1-methyl-2-hydroxycyclopentylamine;
2-amino-2-methyl-3-pentanol;
2,4-dimethyl-2-amino cyclohexanol;
1-hydroxyethyl cyclohexylamine;
1-hydroxymethyl-3-methyl cyclohexylamine;
2-hydroxy methyl-1-methyl-cyclohexylamine
2-amino-2-methyl-1-propanol
2-amino-2-methyl-1-butanol;
3-amino-3-methyl-1-butanol;
3-amino-3-methyl-2-butanol;
2-amino-2,3-dimethyl-3-butanol;
2-amino-2,3-dimethyl-1-butanol;
1-hydroxymethylcyclohexylamine;
2(2-amino-2-methylpropoxy)-ethanol;
2-piperidine methanol;
2-piperidine ethanol;
2-(1-hydroxyethyl)-piperidine;
5-hydroxy-2-methyl piperidine;
2-methyl-3-hydroxy piperidine;
2,6-dimethyl-3-hydroxy piperidine;
2,5-dimethyl-4-hydroxy piperidine;
2-tert.butylamino-methyl-1,4-dimethyl-piperazine;
1-tert.butylamino-3,6-dimethyl-3,6-diaza-cycloheptane.

5. A composition comprising an aqueous solution which comprises: (1) 20 to about 30 weight percent potassium carbonate and (2) at least 2 weight percent of at least one sterically hindered amine selected from the group consisting of: N-cyclohexyl-1,3-propanediamine; 1,8-p-menthanediamine; 1,7-bis-sec.butyl-diethylenetriamine; 2,2,5,5-tetramethyldiethylenetriamine; 3-amino-3-methyl-1-butanol; 2-amino-2-methyl-1-propanol; N₁-isopropyl-2-methyl-1,2-propanediamine; N₁-(1,1-dimethyl-2-hydroxyethyl)-2-methyl-1,2-propanediamine, and N₁-isopropyl-N₂-(3-aminopropyl)-2-methyl-1,2-propanediamine.

6. A composition comprising an aqueous solution which comprises: (a) 20 to about 30 weight percent potassium carbonate and (b) at least 2 weight percent of N-cyclohexyl-1,3-propanediamine.

7. The composition of claim 6 which additionally includes an additive selected from the group consisting of antifoaming agents, antioxidants, corrosion inhibitors and mixtures thereof.

8. The composition of claim 1 wherein said sterically hindered amine is selected from the group consisting of: monoprimary aliphatic diamines; arylaliphatic diamines in which the amino groups are separated by up to 5 or more than 6 carbon atoms; cycloaliphatic diamines; biprimary aliphatic diamines in which the nitrogen atoms are separated by up to 5 or more than 6 carbon atoms; disecondary aliphatic diamines; secondary-tertiary diamines; cycloaliphatic triamines; aliphatic triamines containing at most one primary amino group; biprimary or triprimary aliphatic triamines, in which any two vicinal amino groups are separated by up to 5 or more than 6 carbon atoms; cycloaliphatic diaminoalcohols; diaminoalcohols containing at most one primary amino group; sterically hindered primary monoaminoalcohols; sterically hindered amino-hydroxyalkyl ethers; 2-substituted piperidines; piperazine derivatives; and azacyclo alkanes.

9. The composition of claim 1 wherein said sterically hindered amine is a cycloaliphatic diamine.

10. The composition of claim 9 wherein said cycloaliphatic diamine is selected from the group consisting of: N₁-cyclohexyl-1,2-propanediamine; 1-amino-1-(2-amino-isopropyl)-cyclohexane; 1-methylamino-1-aminomethyl-cyclopentane; 1-amino-1-aminomethylcycloheptane; N-isopropyl-1,2-diaminocyclohexane; N₂-cyclohexyl-1,2-butanediamine; N₂-cyclohexyl-1,2-propanediamine; N-cycloheptyl-ethylenediamine; N₁-cyclohexyl-2-methyl-1,2-propanediamine; 1-(2-aminoisopropyl)-2-amino-3-methyl-cyclopentane; N-isopropyl-1,4-diamino-cyclohexane; N₁-cyclohexyl-N₂-methyl-ethylenediamine; N-cyclohexyl-ethylenediamine; N₁-cyclohexyl-N₂-ethyl-ethylenediamine; N₁-cyclohexyl-N₂-methyl-1,2-propanediamine; N-cyclohexyl-1,3-propanediamine; 1,8-p-menthanediamine; 1-amino-1-aminomethylcyclohexane; 1,3-diamino-1-methylcyclohexane; and N₂-cyclohexyl-2-methyl-1,2-propanediamine.

11. The composition of claim 9 wherein said cycloaliphatic diamine is N-cyclohexyl-1,3-propanediamine.

12. The composition of claims 1, 4, 8, 9, 10 or 11 which additionally includes an additive selected from the group consisting of antifoaming agents, antioxidants, corrosion inhibitors and mixtures thereof.

* * * * *